US012411906B2

(12) United States Patent
Keslin et al.

(10) Patent No.: US 12,411,906 B2
(45) Date of Patent: *Sep. 9, 2025

(54) SYSTEMS AND METHODS FOR PRE-LOADING OBJECT MODELS

(71) Applicant: RELATIVITY ODA LLC, Chicago, IL (US)

(72) Inventors: Joseph Keslin, Munster, IN (US); Karl Knoernschild, La Grange, IL (US)

(73) Assignee: RELATIVITY ODA LLC, Chicago, IL (US)

( * ) Notice: Subject to any disclaimer, the term of this patent is extended or adjusted under 35 U.S.C. 154(b) by 27 days.

This patent is subject to a terminal disclaimer.

(21) Appl. No.: 18/380,092

(22) Filed: Oct. 13, 2023

(65) Prior Publication Data

US 2024/0086490 A1 Mar. 14, 2024

Related U.S. Application Data

(63) Continuation of application No. 17/711,899, filed on Apr. 1, 2022, now Pat. No. 11,797,635.

(Continued)

(51) Int. Cl.

*G06F 16/957* (2019.01)
*G06F 3/0482* (2013.01)

(Continued)

(52) U.S. Cl.

CPC ........ *G06F 16/9574* (2019.01); *G06F 3/0482* (2013.01); *G06F 3/0484* (2013.01);

(Continued)

(58) Field of Classification Search

CPC .. G06F 16/9574; G06F 3/0482; G06F 3/0484; G06F 3/0485; G06F 16/338;

(Continued)

(56) References Cited

U.S. PATENT DOCUMENTS 6,098,064 A 8/2000 Pirolli et al.
6,453,319 B1 9/2002 Mattis et al.

(Continued)

OTHER PUBLICATIONS

Mozilla.org "Search with the Firefox address bar" Dec. 3, 2020, pp. 1-6 https://web.archive.org/web/20201203211123/https://support.mozilla.org/en-us/kb/search-firefox-address-bar) as available Dec. 3, 2020 (Year: 2020).

(Continued)

*Primary Examiner* — Asher D Kells

(74) *Attorney, Agent, or Firm* — MARSHALL, GERSTEIN & BORUN LLP; Randall G. Rueth

(57) ABSTRACT

A computer-implemented method includes generating a user interface; receiving a set of object models; processing the received object models; and rendering the document model via a viewport. A non-transitory computer readable medium contains program instructions that when executed, cause a computer to generate a user interface; receive a set of object models; process the received object models; and render the document model via a viewport. A computing system includes a processor and a memory having stored thereon instructions that when executed by the process, cause the computing system to generate a user interface; receive a set of object models; process the received object models; and render the document model via a viewport.

19 Claims, 24 Drawing Sheets

Related U.S. Application Data

(60) Provisional application No. 63/170,111, filed on Apr. 2, 2021.

(51) Int. Cl.

| | |
|---|---|
| ***G06F 3/0484*** | (2022.01) |
| ***G06F 3/0485*** | (2022.01) |
| ***G06F 16/338*** | (2019.01) |
| ***G06F 16/34*** | (2025.01) |
| ***G06F 16/358*** | (2025.01) |
| ***G06F 16/93*** | (2019.01) |
| ***G06F 16/958*** | (2019.01) |
| ***G06F 40/103*** | (2020.01) |
| ***G06F 40/106*** | (2020.01) |
| ***G06F 40/123*** | (2020.01) |
| ***G06F 40/131*** | (2020.01) |
| ***G06F 40/171*** | (2020.01) |
| ***G06Q 50/18*** | (2012.01) |
| ***G06V 30/14*** | (2022.01) |
| ***G06V 30/414*** | (2022.01) |

(52) U.S. Cl.

CPC .......... *G06F 3/0485* (2013.01); *G06F 16/338* (2019.01); *G06F 16/34* (2019.01); *G06F 16/358* (2019.01); *G06F 16/93* (2019.01); *G06F 16/9577* (2019.01); *G06F 16/986* (2019.01); *G06F 40/103* (2020.01); *G06F 40/106* (2020.01); *G06F 40/123* (2020.01); *G06F 40/131* (2020.01); *G06Q 50/184* (2013.01); *G06V 30/1444* (2022.01); *G06V 30/414* (2022.01); *G06F 40/171* (2020.01); *G06F 2203/04803* (2013.01)

(58) Field of Classification Search

CPC ........ G06F 16/34; G06F 16/358; G06F 16/93; G06F 16/9577; G06F 16/986; G06F 40/103; G06F 40/106; G06F 40/123; G06F 40/131; G06F 40/171; G06F 2203/04803; G06Q 50/184; G06V 30/1444; G06V 30/414

See application file for complete search history.

(56) References Cited

U.S. PATENT DOCUMENTS

| | | | | |
|---|---|---|---|---|
| 7,747,749 | B1 | 6/2010 | Erikson et al. | |
| 8,346,563 | B1 | 1/2013 | Hjelm et al. | |
| 8,438,474 | B1 * | 5/2013 | Lloyd | G06F 16/9574 715/241 |
| 9,178,934 | B1 | 11/2015 | Kolam | |
| 9,269,053 | B2 | 2/2016 | Naslund et al. | |
| 9,274,595 | B2 | 3/2016 | Reitan | |
| 9,307,007 | B2 | 4/2016 | Kapadia et al. | |
| 9,582,600 | B1 | 2/2017 | Killian et al. | |
| 9,626,343 | B2 | 4/2017 | Zhang et al. | |
| 9,792,266 | B1 | 10/2017 | Armstrong et al. | |
| 9,799,131 | B1 | 10/2017 | Demiralp et al. | |
| 9,898,446 | B2 | 2/2018 | Weber et al. | |
| 9,940,396 | B1 | 4/2018 | Willhoit | |
| 10,185,782 | B2 | 1/2019 | Decker et al. | |
| 10,353,960 | B1 | 7/2019 | Hall et al. | |
| 10,614,033 | B1 | 4/2020 | Rothschilds et al. | |
| 10,630,797 | B2 | 4/2020 | Goel et al. | |
| 10,868,881 | B1 | 12/2020 | Chang | |
| 10,984,000 | B2 | 4/2021 | Bedrax-Weiss et al. | |
| 11,238,210 | B2 | 2/2022 | Ziraknejad et al. | |
| 11,438,442 | B1 | 9/2022 | Polehn et al. | |
| 11,734,498 | B1 | 8/2023 | Shenk | |
| 11,741,517 | B1 | 8/2023 | Eidam et al. | |
| 11,797,635 | B2 | 10/2023 | Keslin et al. | |
| 2002/0015042 | A1 | 2/2002 | Robotham et al. | |
| 2002/0147895 | A1 | 10/2002 | Glance et al. | |
| 2002/0165925 | A1 | 11/2002 | Hamilton et al. | |
| 2003/0005038 | A1 | 1/2003 | Codella et al. | |
| 2004/0239681 | A1 | 12/2004 | Robotham et al. | |
| 2006/0041521 | A1 | 2/2006 | Oral et al. | |
| 2006/0047804 | A1 | 3/2006 | Fredricksen et al. | |
| 2006/0155728 | A1 | 7/2006 | Bosarge | |
| 2007/0112973 | A1 | 5/2007 | Harris et al. | |
| 2008/0239365 | A1 | 10/2008 | Salgado et al. | |
| 2008/0288729 | A1 * | 11/2008 | Goel | G06F 40/10 |
| 2009/0006329 | A1 | 1/2009 | Cong et al. | |
| 2010/0162126 | A1 | 6/2010 | Donaldson et al. | |
| 2010/0318538 | A1 | 12/2010 | Wyman et al. | |
| 2011/0145287 | A1 | 6/2011 | Jiang et al. | |
| 2012/0011430 | A1 | 1/2012 | Parker et al. | |
| 2013/0067170 | A1 | 3/2013 | Lam | |
| 2013/0219256 | A1 | 8/2013 | Lloyd et al. | |
| 2013/0268260 | A1 | 10/2013 | Lundberg et al. | |
| 2013/0304798 | A1 | 11/2013 | Chang et al. | |
| 2014/0108909 | A1 | 4/2014 | Geelnard | |
| 2014/0281918 | A1 | 9/2014 | Wei et al. | |
| 2014/0372511 | A1 | 12/2014 | Kapadia et al. | |
| 2015/0007108 | A1 | 1/2015 | Ozcelik | |
| 2015/0066940 | A1 | 3/2015 | Fernandes et al. | |
| 2015/0088970 | A1 | 3/2015 | Wei et al. | |
| 2015/0089352 | A1 | 3/2015 | Conboy et al. | |
| 2015/0154192 | A1 | 6/2015 | Lysne et al. | |
| 2015/0193413 | A1 | 7/2015 | Meschkat | |
| 2015/0242543 | A1 | 8/2015 | Bailly et al. | |
| 2015/0278172 | A1 | 10/2015 | Tupil et al. | |
| 2015/0339050 | A1 | 11/2015 | Vong | |
| 2015/0370445 | A1 | 12/2015 | Wang et al. | |
| 2016/0335746 | A1 | 11/2016 | Loke | |
| 2017/0031873 | A1 | 2/2017 | Levi et al. | |
| 2017/0048319 | A1 | 2/2017 | Straub | |
| 2017/0053623 | A1 | 2/2017 | Purayil et al. | |
| 2017/0060812 | A1 | 3/2017 | Williams et al. | |
| 2017/0083508 | A1 | 3/2017 | Dixon et al. | |
| 2017/0132530 | A1 | 5/2017 | Puzicha et al. | |
| 2017/0199850 | A1 | 7/2017 | Mishra et al. | |
| 2017/0235827 | A1 | 8/2017 | Bar-Or et al. | |
| 2017/0269816 | A1 | 9/2017 | Bradley et al. | |
| 2018/0081503 | A1 * | 3/2018 | Green | G06N 3/045 |
| 2018/0322106 | A1 | 11/2018 | Roks | |
| 2019/0005265 | A1 | 1/2019 | Panchapakesan et al. | |
| 2019/0005616 | A1 | 1/2019 | De et al. | |
| 2019/0079946 | A1 | 3/2019 | Li et al. | |
| 2019/0320222 | A1 | 10/2019 | Bertsch et al. | |
| 2019/0325031 | A1 | 10/2019 | Puzicha | |
| 2019/0327324 | A1 | 10/2019 | Buffone | |
| 2020/0026768 | A1 | 1/2020 | Puzicha et al. | |
| 2020/0081692 | A1 | 3/2020 | Multerer | |
| 2020/0174755 | A1 | 6/2020 | Rose et al. | |
| 2020/0174757 | A1 | 6/2020 | Rose et al. | |
| 2020/0226195 | A1 | 7/2020 | Ziraknejad et al. | |
| 2021/0056233 | A1 | 2/2021 | Camery | |
| 2021/0365504 | A1 | 11/2021 | Kuehne et al. | |
| 2022/0043880 | A1 | 2/2022 | Yoon et al. | |
| 2022/0158978 | A1 | 5/2022 | Shribman et al. | |
| 2022/0237234 | A1 | 7/2022 | Ahmed et al. | |
| 2022/0269738 | A1 | 8/2022 | Stone et al. | |
| 2022/0318287 | A1 | 10/2022 | Keslin et al. | |
| 2022/0318333 | A1 | 10/2022 | Keslin et al. | |
| 2022/0318335 | A1 | 10/2022 | Keslin et al. | |
| 2022/0318484 | A1 | 10/2022 | Keslin et al. | |
| 2022/0318491 | A1 | 10/2022 | Keslin et al. | |
| 2022/0334809 | A1 | 10/2022 | Stone et al. | |
| 2023/0041844 | A1 | 2/2023 | Feng et al. | |
| 2023/0195300 | A1 | 6/2023 | Matlin | |

OTHER PUBLICATIONS

"Would a 5ms response affect my gaming experience," by r/pcmasterrace downloaded from the Internet at: <https://www.reddit.com/r/pcmasterrace/comments/42ompq/would_a_5ms_response_affect_my_gaming_experience/> as of at least Jul. 26, 2018 (Reddit) (2018).

(56) References Cited

OTHER PUBLICATIONS

Grechanik et al. "Redacting sensitive information in software artifacts," Proceedings of the 22nd International Conference on Program Comprehension 2014.
Pratheeka et al., Sanitization of medical documents using medical support system, 2014 International Conference on Recent Trends in Information Technology (IEEE)(2014).
Woods et al., Redacting private and sensitive information in born-digital collections, Archiving Conference, vol. 12, Society for Imaging Science and Technology (2015).

* cited by examiner

670

7000

SYSTEMS AND METHODS FOR PRE-LOADING OBJECT MODELS

CROSS-REFERENCE TO RELATED APPLICATIONS

This application is a continuation of U.S. patent application Ser. No. 17/711,899, entitled SYSTEMS AND METHODS FOR PRE-LOADING OBJECT MODELS, filed on Apr. 1, 2022, which claims priority to U.S. Provisional Application No. 63/170,111, entitled METHODS AND SYSTEMS FOR IMPLEMENTING HEADLESS OBJECTS, filed on Apr. 2, 2021, the entire contents of which are incorporated herein by reference in its entirety.

FIELD OF THE DISCLOSURE

The present disclosure relates generally to document viewing platforms, and more particularly to techniques that reduce the time it takes to display a document via document viewing platforms.

BACKGROUND

In the eDiscovery process commonly associated with litigation, for example, reviewers (e.g., attorneys) are commonly provided with a voluminous corpus of documents (e.g., emails, SMS communications, group texts, presentations, reports, spreadsheets, etc.) that conform to a discovery request. Additionally, a party producing documents in response to a discovery request may need to analyze an even larger document set to identify only the particular documents within the scope of the discovery request. This may involve the need to review millions of documents. While the proliferation of machine learning techniques has reduced the need to manually review each and every document, manual review is still needed to train the machine learning classifiers such that there is sufficient statistical confidence that the classifiers can be accurately applied to the rest of the corpus of documents. Thus, often, there is still a need to manually review thousands of documents.

In another context, a user may be searching a large corpus of documents to find documents relevant to a query. For example, a researcher may be searching a corpus of medical research journal articles or a patent searcher may be searching multiple patent publication databases. Given the complex nature of these searches, simple string or classification queries may be unable to provide meaningful results to the queries. Accordingly, manual review of these search results is typically performed, even when machine learning techniques are applied to improve the search results.

Conventional techniques do not support pre-loading multiple eDiscovery documents in a web browser concurrently. Specifically, a user must review each individual eDiscovery document serially, wherein each viewing includes downloading, viewing, coding, etc. before a new document can be reviewed. When a user has a large corpus of documents to review, such piecemeal review is slow and time-consuming. The time spent waiting for documents to load can add up to hours of wasted user time, and users may grow impatient while waiting for a first document to be replaced by a second document being loaded synchronously. Further, once the document is loaded, the user must wait even longer for any client-side processing operations to be performed before review may begin.

Accordingly, when a user is reviewing a large number of documents, the computer systems must repetitively perform the task of opening new documents for viewing, analysis, and/or coding. Because of the large number documents being reviewed, the conventional times of opening a document (about 2 seconds) is significant when this delay occurs hundreds, if not thousands, of times throughout the course of the review. Therefore, there is a need improve multiple document preloading, to improve the user experience of techniques for reviewing large document corpora.

BRIEF SUMMARY

In one aspect, a computer-implemented method includes (1) generating, by one or more processors, a user interface including (i) a selection interface, and (ii) a viewport; (2) receiving a set of object models associated with one or more documents, the object models including respective metadata indicating how to render the object models; (3) predictively processing one or more of the received object models to generate one or more corresponding cached document models; and (4) rendering the one or more cached document models via the viewport in accordance with the respective metadata of the corresponding object models.

In another aspect, a non-transitory computer readable medium includes program instructions that when executed, cause a computer to: (1) generate, by one or more processors, a user interface including (i) a selection interface, and (ii) a viewport; (2) receive a set of object models associated with one or more documents, the object models including respective metadata indicating how to render the object models; (3) predictively process one or more of the received object models to generate one or more corresponding cached document models; and (4) render the one or more cached document models via the viewport in accordance with the respective metadata of the corresponding object models.

In yet another aspect, a computing system includes one or more processors, and one or more memories having stored thereon instructions that when executed by the one or more processors, cause the computing system to: (1) generate, by one or more processors, a user interface including (i) a selection interface, and (ii) a viewport; (2) receive a set of object models associated with one or more documents, the object models including respective metadata indicating how to render the object models; (3) predictively process one or more of the received object models to generate one or more corresponding cached document models; and (4) render the one or more cached document models via the viewport in accordance with the respective metadata of the corresponding object models.

DETAILED DESCRIPTION

I. Overview

Figure 1:
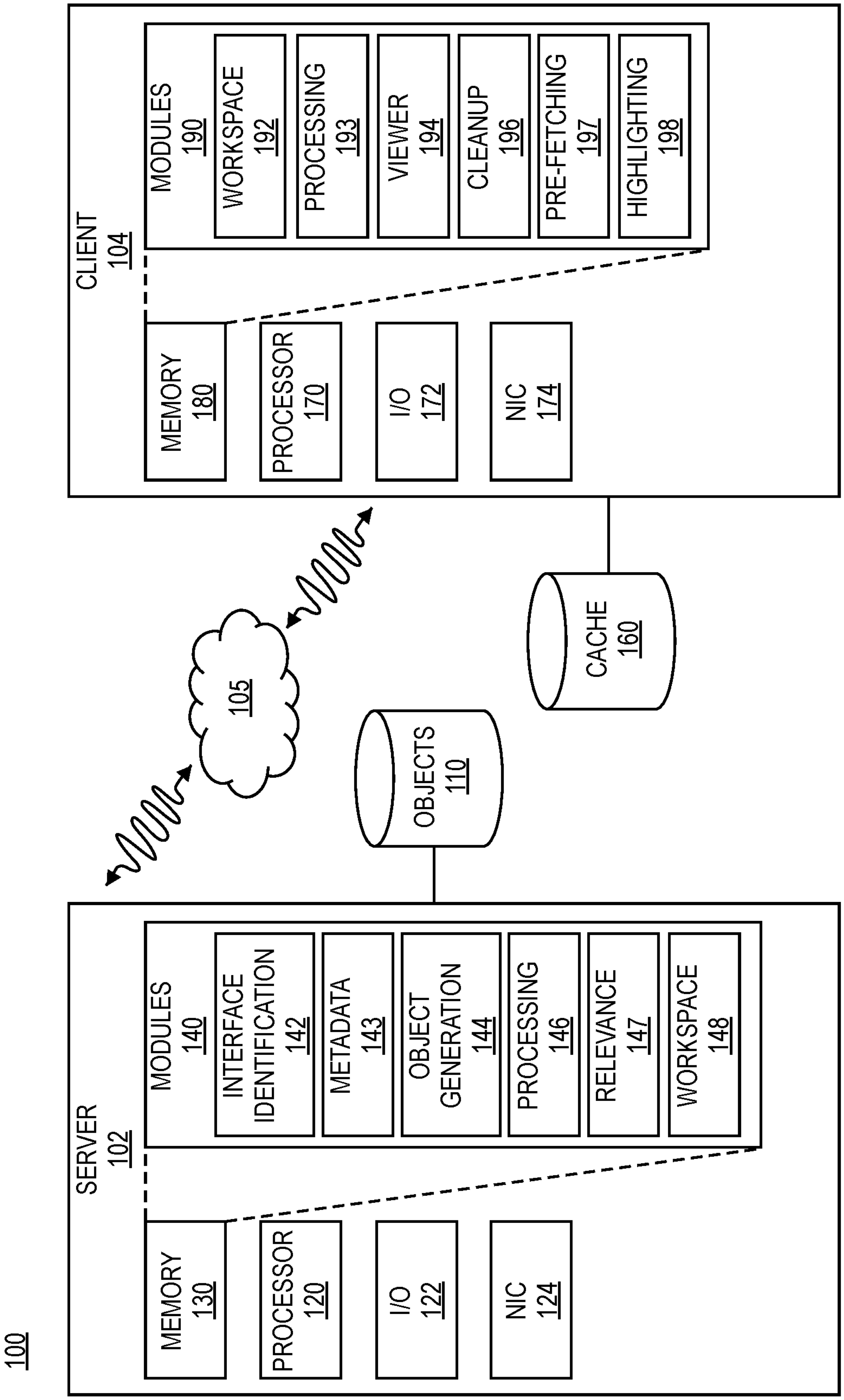
FIG. 1 illustrates an example environment that may be used to implement the disclosed document model techniques, according to an embodiment.

The present techniques relate to the usage of one or more document models to improve the speed at which a user interface is able to display a document associated therewith. The term "object model" may refer to an object representing the "raw data" contents of a document. The term "document model" may refer to an object model on which a computer system has performed data processing techniques to generate a data structure representing the associated document. The generated data structure may include component objects that, in combination, represent a complete document. For example, the component objects may include object representative of segments of the document, such as individual pages, slides, worksheets, or other delimited segment of the document. A document fragment may comprise a subset of the segments that form the complete document. Accordingly, the term "document fragment model" may refer to the collection of processed objects that correspond to subset of segments included in the corresponding document fragment.

It should be appreciated that a typical corpus of documents can include millions of documents. Accordingly, the object models generally comprises the raw document data without any overlays or enhancements that enable quicker processing of the document. This results in an object model of a document having a smaller file size than the document file itself. Accordingly, object models can be more efficiently stored at the server and/or the local cache more quickly transmitted across communication networks. However, without the overlays and enhancements included in the document file, the object file takes longer to render and display than the original document file. Accordingly, by processing the object model to generate the document model for the document, the ability to quickly render and display the document is restored. It should be noted that the processing of the object model to generate the document model is processor intensive. Thus, techniques described herein relate to optimizations in which the object models can efficiently be processed into document models for low latency display of the corresponding document while maintaining the above benefits related to the usage of object models.

The term "headless" may refer to a state of the object as not having been assigned to a user interface viewport via which the rendering can be viewed. As will be explained below, when the document model is assigned to a viewport, it is no longer in the headless state. When the document model is no longer assigned to the viewport, the document model may return to the headless state.

Object models generally correspond to one or more documents. One or more object models may correspond to one or more documents according to any suitable relationship (e.g., in a one-to-one relationship, in a many-to-one relationship, in a one-to-many relationship, in a many-to-many relationship, etc.). As it is used herein, the term "document" refers to any collection of data that conveys visual information to a user of a client device. For example, the document may be a Microsoft Word file, a text file, an email, a pdf, a presentation, a spreadsheet, an image, a messaging file format, and/or other documents. The document may have multiple portions such that the entire document is not viewable at once (e.g., pages of a word document, slides of presentation, sheets of a spreadsheet). In addition to the document itself, the object model may include one or more sets of metadata associated with the document. For example, the metadata may include an indication of an author, a document source, a document date, a relevancy determined by an algorithm, a coding decision, and/or other attributes of the document. As another example, for documents that include text, the metadata may include a raw text file that excludes any formatting characters. For some documents, the raw text file is generated by applying optical character recognition (OCR) techniques.

As yet another example, the metadata may include objects that affect how the document is displayed. To this end, the metadata may include a highlighting object indicative of portions of the document that are highlighted, a redactions object indicative of portions of the document that are redacted, and/or an annotations object indicative of portions of the document including annotations. The highlighting, redactions, and annotations objects may be determined based upon rules and/or data sets associated with the workspace that includes the object model. For instance, a highlighting data set associated with the workspace may indicate that each instance of a particular term is to be highlighted in each document in the workspace. Generally, any reference to displaying or rendering an object model and/or a document model refers to displaying or rendering the corresponding document associated with the model.

II. Example Computing Environment

FIG. 1 depicts an example computing environment 100 that may be used to implement the disclosed object model techniques. As illustrated, the environment 100 includes a server 102 communicatively coupled to a client device 104 via network 105. The network 105 may be a single communication network, or may include multiple communication networks of one or more types (e.g., one or more wired and/or wireless local area networks (LANs), and/or one or more wired and/or wireless wide area networks (WANs) such as the Internet). The server 102 may be a web server, a back-end server, or any combination thereof. Additionally, while FIG. 1 shows only a single client device 104, it is understood that multiple different client devices (of different entities and/or users), each similar to the client device 104, may be in remote communication with the server 102 via the network 105 and/or alternative networks.

As illustrated, the server 102 also includes a network interface controller (NIC) 124. The NIC 124 may include any suitable network interface controller(s), such as wired/wireless controllers (e.g., Ethernet controllers), and facilitate bidirectional/multiplexed networking over the network 105 between the server 102 and other components of the environment 100 (e.g., the client device 104, hardware units that form the server 102 in a distributed computing environment, etc.).

The server 102 includes a processor 120. While referred to in the singular, the processor 120 may include any suitable number of processors of one or more types (e.g., one or more microprocessors, one or more CPUs, one or more GPUs, etc.). Generally, processor 120 is configured to execute software instructions stored in one or more memories 130 (e.g., stored in a persistent memory such as a hard drive or solid state memory) of the server 102. It should be appreciated that certain instructions may be more efficiently executed by different types of processors (e.g., generating an image rendering of a document may be more efficiently performed by a GPU, whereas as the establishment of a workspace may be more efficiently executed by a CPU). Accordingly, the server 102 may be configured to execute different instructions using the different processor types. Additionally, while FIG. 1 depicts a single processor 120 and a single memory 130, the processor 120 and the memory 130 may include any number of processors or processors, including processors and memories located in different physical units and connected via a distributed computing platform.

Generally, the server 102 hosts services relating to electronic document review, which may be accessed/utilized by the client device 104. For example, one service may relate to an eDiscovery document review service and another service may relate to conducting searches of document database(s). The software instructions stored in the memory 130, when executed by the processor 120, implement one or modules 140 that support the services. For example, a first module of the modules 140 is a workspace module 148 configured to establish the workspace of documents to be reviewed. For example the workspace module 148 may implement one or more document collection modules for importing a plurality of documents into the workspace. As another example, the workspace module 148 may receive one or more search and/or filter queries to restrict a large corpus of document down to a particularly relevant segment of the corpus. For instance, the workspace module 148 may receive a content-based query and a time-based query to reduce a patent document database from a corpus of over 10 million documents to a set of about 300,000 most relevant documents. Accordingly, the workspace module 148 may store documents associated with the workspace (and their corresponding metadata) into an object database 110. The object database 110 may be implemented using a relational database management system (RDBMS) such as MySQL, PostgreSQL, Oracle, etc. or a non-relational database structure, such as a NoSQL structure.

As part of storing a document in the object database 110, the server 102 may execute an object generation module 144 to generate an object model that describes the document. To facilitate the generation of the object model, the object generation module 144 may execute functions associated with a metadata processing module 143 and/or a document processing module 146. The metadata processing module 143 may analyze the document then populate a set of metadata associated with document attributes and generate a raw text file associated with any text in the document. Additionally, the metadata processing module 143 may fill metadata fields associated with review of the document (a relevancy selection, reviewer notes, and/or other fields) with default values. The metadata processing module 143 may also ensure any highlighting or redaction data sets of the workspace are associated with the document. The document processing module 146 may be configured to analyze any highlighting or redaction sets, the raw text file, and/or the document file itself to generate image files of the document that comply with the highlighting and/or redaction data sets. In some embodiments, the document processing module 146 creates a layer that includes the highlighting and/or redactions and burns the layer created layer on top of an image of the document. In other embodiments, the highlighting and/or redaction layers are maintained as a separate image file or data structure for processing at the client device 104 when the document is displayed thereat.

The server 102 may also be configured to execute a relevance module 147 to assign a relevancy score to documents within the workspace. For example, the relevance module 147 may maintain and update a machine learning model based upon input received from client devices 104 as to the relevancy of documents. To this end, the machine learning model may be trained to define a boundary in a multi-dimensional space to which the workspace documents are mapped. As inputs are received from client device 104, the relevance module 147 may update the algorithm for determining document relevancy to maintain a document relevance metadata parameter at the object database 110. For some workspaces, the server 102 relies upon the relevancy score to sort the documents such that users of client devices 104 review the most relevant documents first.

In the illustrated example, the server 102 also includes one or more input/output (I/O) devices 122. For example, the server 102 may include a mouse or keyboard to enable a user to configure settings of the server 102, update and/or install the software modules 140, and/or perform various other server maintenance tasks. As another example, the server 102 may include a display screen via which a user is able to view one or more graphical user interfaces. It should be appreciated that in some embodiments, such as when the server 102 is part of a cloud computing environment, the server 102 may not include an I/O device 122.

The client device 104 may be a laptop computer, a desktop computer, a tablet, a smartphone, or any other suitable type of computing device. In the embodiment of FIG. 1, the client device 104 includes a processor 170. The processor 170 may include one or more microprocessors (e.g., one or more central processing units (CPUs) and/or one or more graphics processing units (GPUs)), for example. Additionally, the client device 104 includes a memory 180. The memory 180 may include program memory that stores software instructions that form one or more modules 190 and a data memory configured to document models of documents associated with headless objects. Generally, the processor 170 is configured to execute software instructions stored in the program memory of the memory 180. The program storage may include one or more persistent memories (e.g., a hard drive and/or solid state memory) and the data memory may include temporary memories, such as buffers, for storing the document models. In some embodiments, the data memory is a dedicated segment of a physical memory unit at the client device 104. Additionally or alternatively, the data memory may be a component of a graphics card or chipset included in the client device 104.

As illustrated, the client device 104 also includes a network interface controller (NIC) 174. The NIC 174 may include any suitable network interface controller(s), such as wired/wireless controllers (e.g., Ethernet controllers), and facilitate bidirectional/multiplexed networking over the network 105 between the client device 104 and other components of the environment 100 (e.g., another client device 104, the server 102, etc.). The client device also includes one or more I/O devices 172. For example, the client device 104 may include a display screen via which the graphical user interfaces described herein are displayed. As another example, the client device 104 may include a mouse, keyboard, and/or a touch screen to enable a user to interact with the various graphical user interfaces described herein.

As illustrated, the client device 104 includes a cache 160. To this end, workspaces often include too many documents to practically store the corresponding object models at the client device 104. Accordingly, the cache 160 may be configured to store a subset of the object models corresponding to documents that the user of the client device 104 is likely to review. To this end, the client device 104 may execute a workspace module 192 to interact with the workspace maintained at the server 102. For example, the client device 104 (and/or the user thereof) may be assigned a batch of documents for manual review. Accordingly, upon logging into the workspace, the workspace module 192 may fetch the batch of object models corresponding to the documents assigned to the user of the client device 104. As another example, the workspace module 192 may determine that the user is reviewing a list of sorted documents and fetch a portion of the object models corresponding to the sorted documents in accordance with the sorted list. The workspace module 192 may then store the fetched object models in the cache 160.

The workspace module 192 may be also be configured to monitor a document context to identify that one or more additional object models should be stored in the cache 160. To this end, if the user has reviewed a predetermined number of documents in the batch and/or list of documents, the workspace module 192 may communicate with the server 102 to fetch an additional set of object models for storage at the cache 160. Additionally, the workspace module 192 may delete object models from the cache 160 when the user has navigated a predetermined number of documents away from the cached object model.

To improve the speed at which the client device 104 is able to display the fetched object models, the client device 104 may execute an object processing module 193 to begin processing the object models. For example, the object processing module 193 may process the first object model in the assign batch or included in the sorted list of documents. To this end, the object processing module 193 may perform the data processing techniques typically performed to display documents of the corresponding document type to generate a partial or complete document model associated with the object model. The object processing module 193 may then store the document model in the data memory of the memory 180. It should be appreciated that simply storing the document model in the data memory does not cause the client device 104 to display the document. Rather, the storage of the document model in the data memory enables the client device 104 to perform the data processing techniques prior to the display of the document such that when the document is displayed, the client device 104 does not need to generate the document model.

Some documents may include many pages (e.g., over 5, over 10, over 25, etc.). Accordingly, rather than generating and storing a document fragment model representative of each page in the data memory, the object processing module 193 may only generate and store a document fragment model for a first page and/or a predetermined number of first pages.

The client device 104 may execute a viewer module 194 to display a user interface associated with the workspace. More particularly, the viewer module 194 may be configured to interact with an interface identification module 142 of the server 102 to obtain a user interface framework and/or populate data indicated by a local or remote user interface framework. For example, the user interface may include a selection interface that enables the user to select a particular document from a plurality of documents. To this end, the selection interface may include a ranked list of documents or an ordered list of documents corresponding to an assigned batch of documents. The user interface may also include a viewport via which renderings of documents are displayed. In particular, the viewport may include an object focus setting that causes the assigned document to be displayed via the viewport. For example, if the user selects a particular document via the selection interface, the viewer module 194 may then set the object focus of the viewport to the document model of the corresponding document. If a corresponding document model is stored in the data memory, the viewer module 194 retrieves the document model stored in the memory location associated with the document and displays the document model via the viewport. In some embodiments, the viewport is a dedicated portion of the user interface (e.g., a document preview panel). In other embodiments, the viewport is transient (e.g., a thumbnail preview displayed when a cursors hovers on a particular object in the selection interface for a threshold amount of time). In still other embodiments, the user interface includes multiple viewports having respective object focus settings.

In some embodiments, the selection interface generated by the viewer module 194 is primary interface, whereas the user interface also includes a secondary interface via which a selected document is reviewed. For example, the secondary interface may be a document viewer interface configured to provide a larger viewport to facilitate review of the displayed document. In this embodiment, when the user interface switches between the primary and secondary interfaces, the document model is already stored in the data memory. Accordingly, when the viewer module 194 switches to displaying the secondary interface, the viewer module 194 is able to display the document model in the viewport of the secondary interface without re-fetching the document data from the server 102 and without re-generating the document model for the document.

The viewer module 194 may also be configured to monitor a document context in the viewport. That is, the viewer module 194 may be configured to monitor the particular portions of the document displayed within the viewport. As discussed above, in some embodiments, the object processing module 193 may only store document fragment models representative of an initial portion of the document. Accordingly, the viewer module 194 may monitor the document context to determine that a document fragment model of additional portions of the document should be stored in the data memory. Thus, as the user scrolls through the document, the client device 104 is predictively loading the data memory with document fragment models representing different portions of the document.

It should be appreciated that displaying highlighting, redactions, and annotations may be more processor intensive than displaying a rendering of a document that does not include highlighting, redactions, or annotations. To this end, in embodiments where the highlighting data is maintained as a highlighting set, the viewer module 194 may need to determine the particular location in the viewport particular terms are displayed to ensure that the terms are highlighted when displayed. Accordingly, for these objects, the viewer module 194 may invoke functions of a highlighting module 198 to ensure that the highlighting is only applied to the document when the corresponding portion of the document is viewable with the viewport. As a result, the client device 104 does not spend processing power highlighting the document when the highlighted text is not visible.

As another improvement, the viewer module 194 may monitor the particular document displayed in the viewport to improve the speed at which the client device 104 is able display another document. To this end, the client device 104 may invoke functions of a pre-fetching module 197 to generate additional document models for storage in the data memory of the memory 180. In particular, the pre-fetching module 197 may identify a predetermined number of documents before and/or after the current document in the list and/or batch to generate and store document models corresponding to the identified documents in the data memory. Accordingly, when the client device 104 detects an event to switch to a next or previous document, the viewer module 194 is able to obtain the document model already stored in the data memory.

Additionally, the client device 104 may monitor the particular document and/or document context to invoke functions of cleanup module 196. To this end, the cleanup module 196 may be configured to delete the document models from data memory based upon the determined context. For example, if the user has moved a threshold number of documents in the list and/or batch from a document model stored in the data memory, the cleanup module 196 may delete or otherwise make available the corresponding data memory used to store the document model. As another example, if a user has scrolled a threshold number of pages from a document fragment model of a particular page stored in the data memory, the cleanup module 196 may delete or otherwise make available the corresponding data memory used to store the document fragment model of the particular page. It should be appreciated that the cleanup module 196 may still maintain the document fragment model for the first page and/or first predetermined number of pages to facilitate faster switching back to the document.

III. Display of a Document Model

Figure 2:
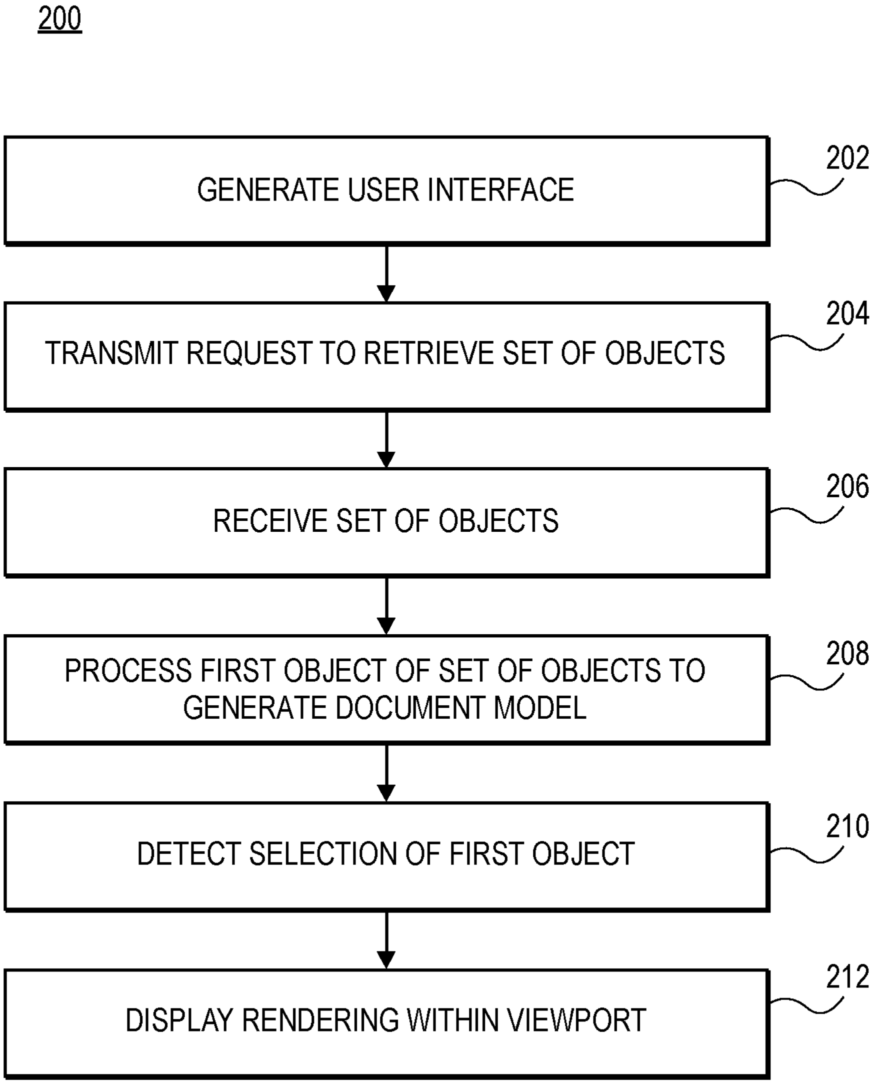
FIG. 2 illustrates an example flow diagram for displaying a document via a user interface, according to an embodiment.

FIG. 2 depicts an example method 200 for displaying a document model at a client device, such as the client device 104. As illustrated, the method 200 begins at block 202 when the client device generates a user interface. For example, the client device may execute a viewer module, such as the viewer module 194 of FIG. 1, to generate the user interface upon the user logging into a workspace associated with a corpus documents.

At block 204, the client device transmits a request to a server, such as the server 102 of FIG. 1, to retrieve a set of objects associated with the workspace. In some embodiments, the request is for a set of the most relevant documents based upon a trained relevancy algorithm (such as one maintained by the relevance module 147 of FIG. 1). In other embodiments, the request is for a batch of documents assigned to the user as part of a document review process. At block 206, the client device receives the object models corresponding to the requested set of documents from the server. The client device may then store the received object models in a local cache, such as the cache 160 of FIG. 1.

At block 208, the client device processes a first object model in the set of set of objects to generate a document model. For example, the client device may execute a object processing module (such as the object processing module 193 of FIG. 1) to generate the document model. Generally, the document model is a set of component objects that represent different parts of the document and/or document metadata. For example, a document model may include an objects that represent pages of a word file, slides of a presentation, worksheets of a spreadsheet, email attachments, etc. The component objects of a document model may also include information related to how the data associated with the object is to be displayed. Accordingly, the object processing module may be configured to analyze the raw document data included in the object model to generate the various objects that form the document model.

The document model may also include component objects that indicate any highlighting, redactions, and/or annotations indicated by the metadata included with the document. It should be appreciated that a component object representative of highlighting or annotations may also be referred to herein as a highlighting model or an annotation model, respectively. In one example, a text highlighting object may indicate a starting and ending offset (e.g., word) in the raw text of the document. As another example, a highlighting object may indicate coordinates that define a location (e.g., a box bounded by a left, top, right, and bottom coordinate) in the displayed document associated with highlighting. As yet another example, a highlighting object for a spreadsheet document may indicate a sheet and cell range associated with highlighting. In addition to the location, the highlighting object may also indicate a highlighting color.

In some embodiments, the client device only processes an initial portion of the object model (e.g., the portions representative of the first page(s) of the document), saving processing of later portions of the object model for other portions of the document to a later time. Accordingly, the client device may generate a document fragment model that includes a set of objects representative of the initial portion of the document. After the client device generates the document model, the client device stores the document model in data memory (such as the data memory included in the memory 180 of FIG. 1. As described elsewhere herein, the client device may also generate document models for a predetermined number of other object models within the received set of object models. It should be appreciated that the generation of the document model occurs prior to the document model becoming the object focus of a user interface viewport.

At block 210, the client device detects an event associated with a selection of the first document. For example, the event may be a mouse click event, a touch screen event, or another event associated with a user selection of the first document. As an example in the batch review process, the event may be an indication that the user is ready to begin reviewing the batch of documents. In this example, the first document may be the first document within the batch.

At block 212, the client device displays a rendering of the first document via a viewport of the user interface. More particularly, in response to detecting the event, the client device may set the object focus setting of the viewport to the first document model. By configuring the object focus setting, the viewer module retrieves the document model stored in the data memory location corresponding to the first document. As a result, the rendering of the first document is displayed in the viewport. It should be appreciated that because the processor intensive generation of the component objects that form the document model occurs prior to detecting the event, the time it takes to display the rendering of the first document after detecting the first event is reduced to approximately the amount of time it takes to render the document model into a viewer module.

Figure 3:
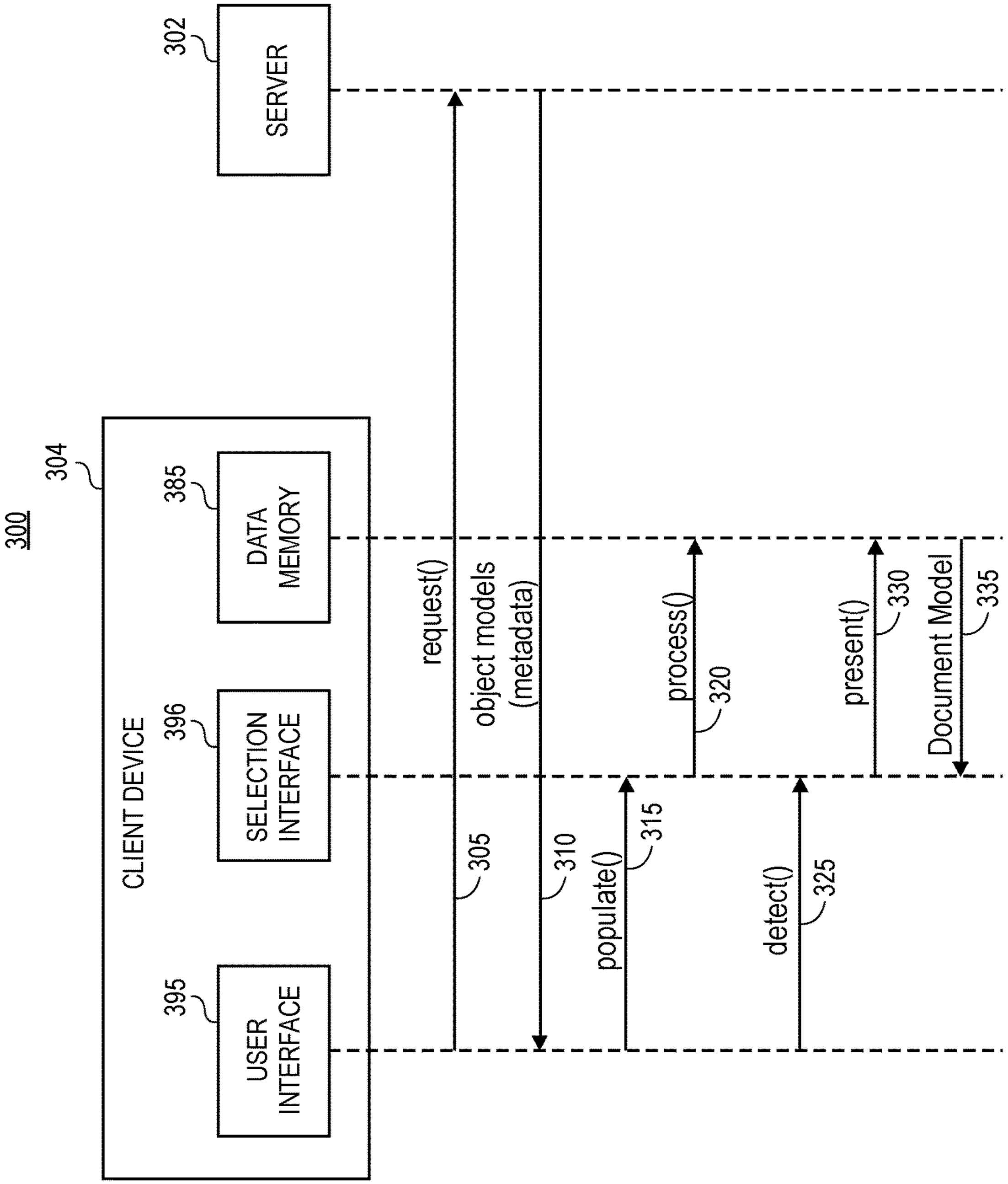
FIG. 3 illustrates an example signal diagram for displaying a document via a user interface, according to an embodiment.

FIG. 3 depicts an example signal diagram 300 representative of commands executed by the client device that performs the method 200. More particularly, the signal diagram 300 illustrates the signals exchanged and/or detected by a user interface 395 (such as a user interface generated by the viewer module 194 of FIG. 1), a selection interface 396 included in the user interface 395, a data memory 385 (such as the data memory portion of the memory 180 of FIG. 1), and a server 302 (such as the server 102 of FIG. 1). The user interface 395, the selection interface 396, and the data memory 385 may be components of a client device 104 (such as the client device 104 of FIG. 1). The client device 304 and the server 302 may be communicative coupled via one or more networks (such as the networks 105 of FIG. 1).

The signal diagram 300 begins when the user interface 395 generates (305) a request to obtain a set of object models from the server 302. For example, the user interface 395 may generate and transmit the request in response to detecting that an element of a user interface framework of the viewer module indicates that the user interface 395 requires data associated with the set of documents to populate the user interface. Accordingly, the request may be formatted based upon the particular set of documents indicated by the user interface framework (e.g., the framework indicates that the user interface is configured to present a batch of documents assigned to the user and/or client device 304 or a ranked list of documents). In some embodiments, the request is formatted in accordance with an API of an interface identification module and/or a workspace module of the server 302. In response to detecting that the user interface 395 generated the request, the client device 304 transmits the request to the server 302.

In response, the client device 304 receives (310) the request set of object models and the corresponding metadata included therewith. In some embodiments, a notification associated with the reception of the set of object models is routed to the user interface 395, which populates to corresponding portion of the user interference with the data indicated by the user interface framework. For example, a portion of the user interface 395 may be the selection interface 396 via which the user is able to select a particular object model from the set of object models. Accordingly, the user interface 395 may populate (315) the selection interface 396 with selectable indications of the set of headless objects.

As described herein, to improve the speed at which the user interface 395 is able to display the document represented by the object model, the selection interface 396 may begin generating document models (320) for the object models corresponding to the set of documents. For example, the selection interface 396 may generate a document model for the first document in a list of documents presented via the selection interface 396. The selection interface 396 may store any generated document models in the data memory 385.

The user interface 395 may also be configured to detect (325) an event associated with a selection of the first document. For example, the user interface 395 may be configured to monitor an event bus via which other components write events associated with the user interface 395 and/or the workspace. In this example, the user interface 395 may detect a location interaction event corresponding to a user clicking a mouse or touching a screen at a location on the selection interface 396 associated with an indication of the first document. As another example, the user interface 395 may include a search element to conduct a search of documents indicated via the selection interface 396. In this example, the event may be an indication of the first search result.

In response to detecting the event, the user interface 395 may configure a viewport associated with the selection interface to present (330) a rendering of the first document. In some embodiments, the user interface 395 sets an object focus of the viewport to the document model corresponding to the first document. In response, the selection interface 396 obtains the document model (335) corresponding to the document from the data memory 385 for display via the viewport. It should be appreciated that in alternate embodiments, the actions described with a particular component of the signal diagram 300 may be performed by a different component of the client device 304 and/or the server 302.

IV. Predictive Rendering of Portions of Headless Object

Embodiments described herein relate to incremental rendering of a document, and more particularly, to improving the speed at which a document is displayed through predictively fetching, processing, and storing document models.

Figure 4A:
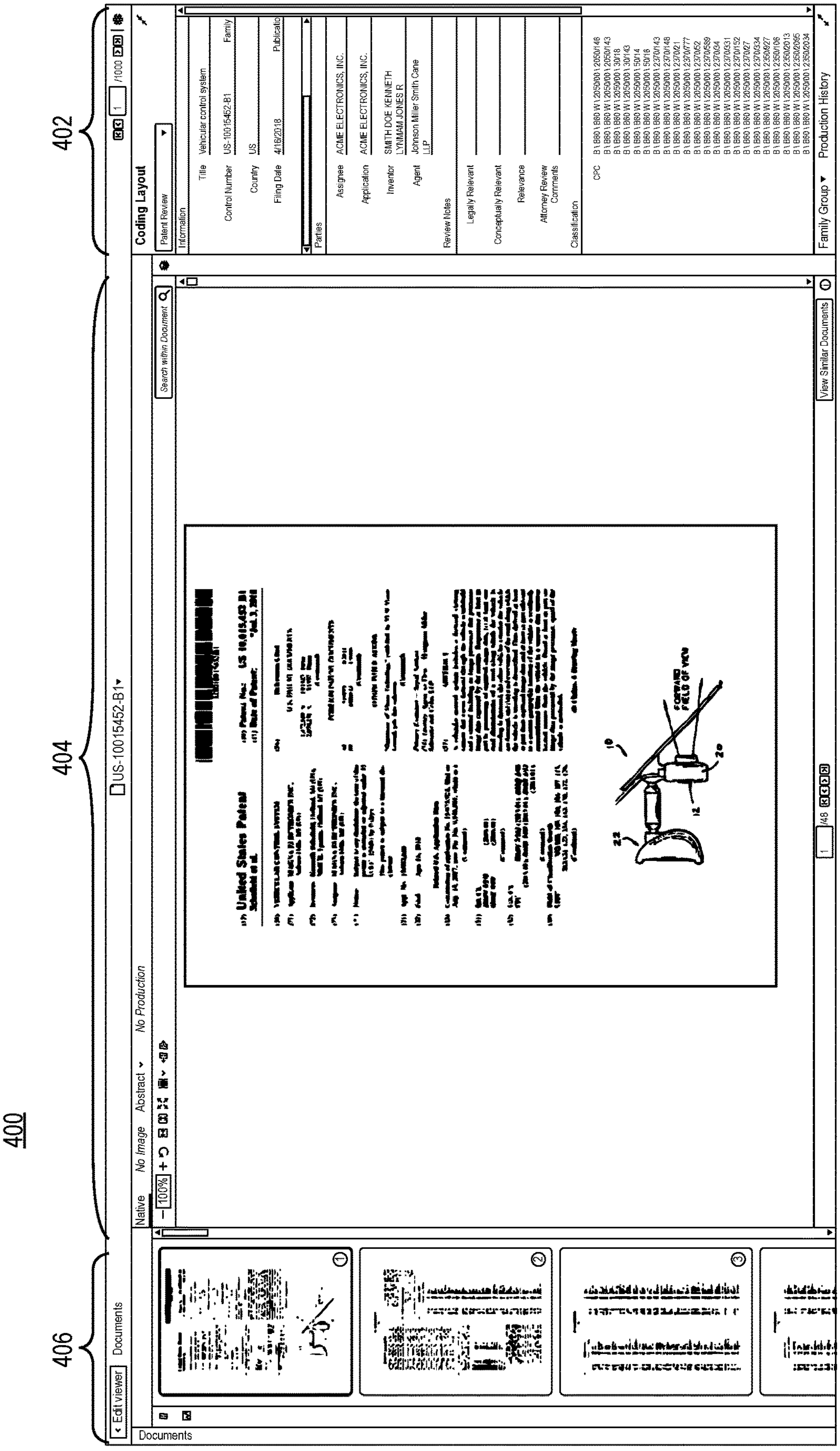
FIG. 4A illustrates an example user interface for displaying a document associated with a document model, according to an embodiment.

FIG. 4A illustrates an example user interface 400 associated with viewing a document. The user interface 400 may be displayed on a client device, such as the client device 104 of FIG. 1. In one embodiment, the user interface 400 is generated by the viewer module 194 of FIG. 1. The example user interface 400 includes a first viewport 404 via which a rendering of a document is displayed. The first viewport 404 may include a first object focus (e.g., an indication of the document) and include a context indicator indicative of the portions of the document viewable via the first viewport 404.

Similarly, the user interface 400 may include a second viewport 406 to facilitate easier navigation to other portions of the document. Like the first viewport 404, the second viewport 406 has an object focus set to the document. That said, because the document is separately navigable via the second viewport 406, the context indicator of the second viewport 406 varies from the context indicator of the first viewport 404. The user interface 400 also includes an information panel 402 via which information about the document is viewable. The viewable information may be stored in a component metadata object included in the corresponding document model.

As illustrated, the user interface 400 displays renderings of an initial portion of the document via the viewports 404, 406. In additional to the document fragment models associated with the visible renderings, the client device may have generated document fragment models for portions of the document adjacent to the visible portions. To this end, these portions of the document represent the portions of the document which are likely to be displayed in the near future in response to detecting user navigation events. It should be appreciated that, to improve the speed at which the user is able to navigate through the document, the client device automatically begin generating document fragment models for these portions of the document upon generating the user interface 400.

Figure 4B:
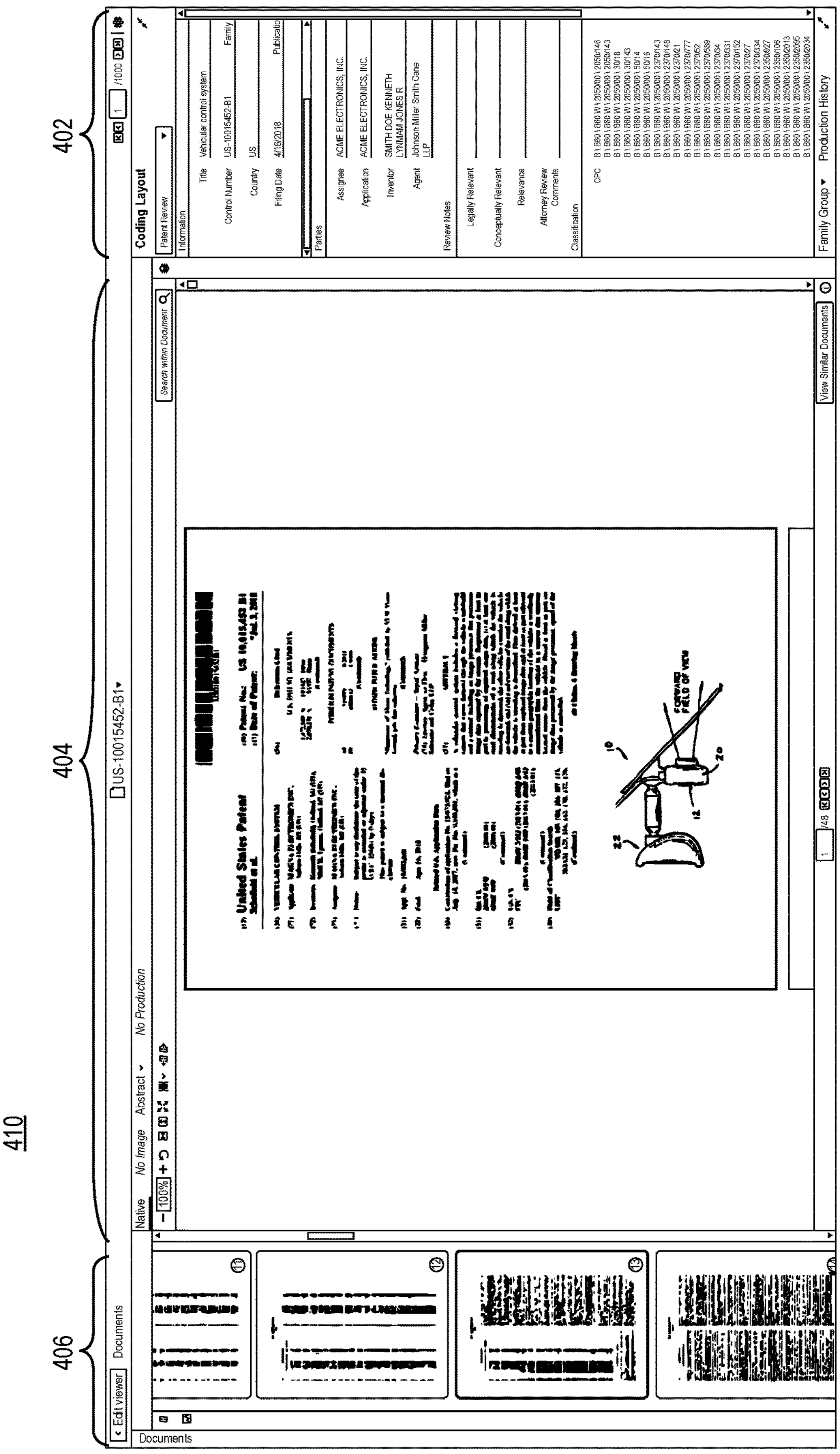
FIG. 4B illustrates an example user interface depicting a user navigation in a document associated with a document model, according to an embodiment.
Figure 4C:
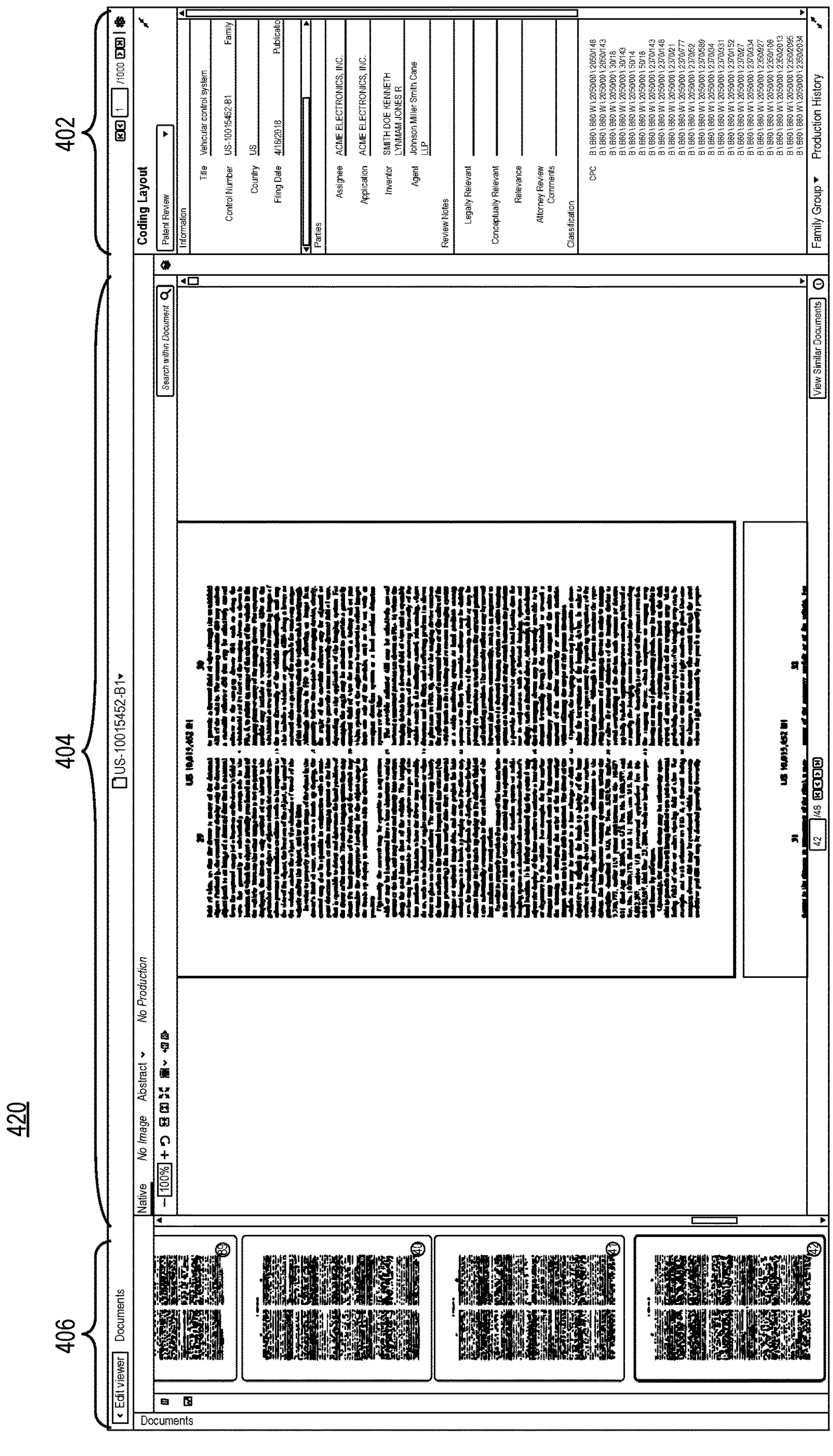
FIG. 4C illustrates an example user interface depicting a user navigation in a document associated with a document model, according to an embodiment.

For example, FIG. 4B illustrates an example user interface 410 in which, in one scenario, the user scrolled to a different portion of the document via the second viewport 406. As another example, FIG. 4C illustrates an example user interface 420 in which, in one scenario, the user scrolled to a different portion of the document via the first viewport 404. In both examples, the context indicator associated with a viewport of the user interface has changed such that different portions of the document are likely to be subsequently viewed by the user. Accordingly, client device may begin generating document fragment models for additional portions of the document to which the user is likely to navigate.

It should be appreciated that the user interfaces 400, 410, and 420 are just a few examples of user interfaces in which the disclosed techniques are implemented. Other user interfaces may include additional, fewer, or alternate user interface elements than those illustrated in FIGS. 4A-4C.

Figure 4D:
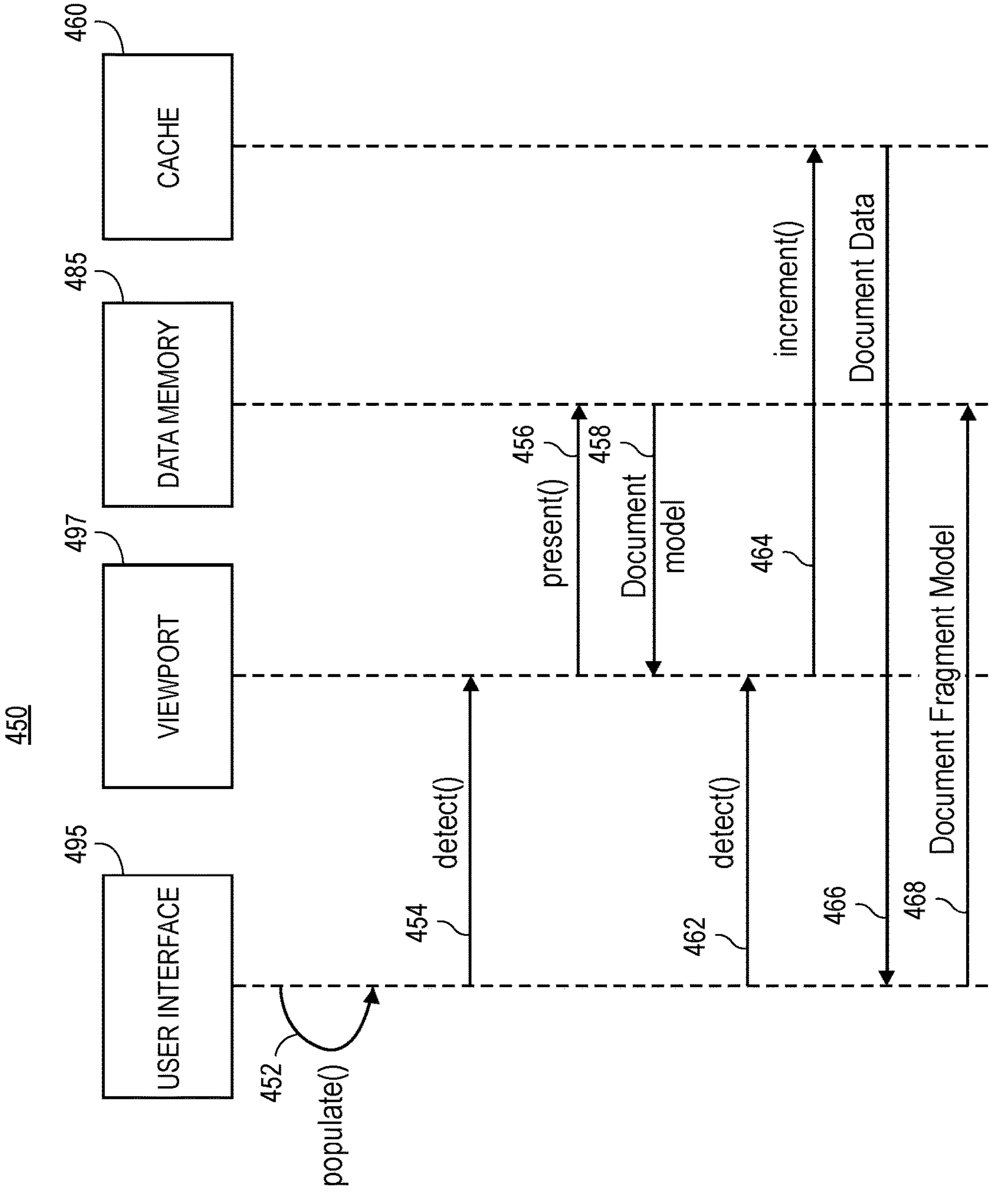
FIG. 4D illustrates an example signal diagram for low-latency incremental display of a document at a client device, according to an embodiment.

FIG. 4D depicts an example signal diagram 450 representative of commands executed by the client device (such as the client device 104 of FIG. 1) to predictively process different portions of a document. More particularly, the signal diagram 450 illustrates the signals exchanged and/or detected by various component of the client device, including a user interface 495 (such as the user interfaces 400, 410, or 420 of FIGS. 4A-4C, respectively), a viewport 497 included in the user interface 495 (such as the viewports 404 or 406 of FIGS. 4A-4C), an data memory 485 (such as the data memory portion of the memory 180 of FIG. 1), and a cache 460 (such as the cache 160 of FIG. 1).

The signal diagram 450 begins when the user interface 495 populates (452) a user interface framework associated with the user interface 495. For example, the user interface 495 may be a document viewer interface, a selection interface having a scrollable document preview interface, or another user interface via which a user can navigate a displayed document. In some embodiments, the user interface 495 may generate a request to fetch data indicated by the user interface from a server to populate particular data fields indicated by the user interface framework. As described elsewhere herein, in some embodiments, populating the user interface 495 may include generating renderings for one or more documents associated with the user interface 495.

The user interface 495 may then detect (454) an event associated with a selection of a document. For example, the user interface 495 may implement techniques described with respect to signal 315 of FIG. 3 to detect the selection event. In response, the user interface 495 sets the object focus of the viewport 497 to be the document model corresponding to the document indicated by the event.

In response to detecting a change in the its object focus, the viewport 497 retrieves a document model for the document from the data memory 485. More particularly, the viewport 497 may initiate a present (456) command via which a memory controller for the data memory 485 fetches the document model and returns (458) it to the viewport 497 for display thereat.

The user interface 495 may then detect (462) an event associated with a user navigating to another portion of the document associated with the displayed document model. For example, the user interface 495 may detect an input from a mouse wheel, an interaction with a scroll bar, an input of a page number, or any other event associated with a user navigating a document. The user interface 495 updates the context indicator of the viewport 497 in accordance with the navigation information indicated by the event.

As a result of the change in document context, the data memory 485 may no longer store document fragment models for the portions of the document to which the user is likely to navigate (e.g., document fragment models of the pages after or before the currently displayed page). Accordingly, the viewport 497 may initiate an incremental data request (464) to load the data memory 495 with document fragment models of these portions of the document. More particularly, the viewport 497 may issue the incremental data request to the cache 460 at which the data associated with the document model resides. In response, the cache 460 provides (466) the corresponding data to the user interface 495, which then generates (468) a document fragment model of the corresponding portions of the document. The user interface 495 then stores the generated document fragment models in the data memory 485. Accordingly, if the user subsequently navigates to these portions of the document, the document fragment models have been predictively stored in the data memory to reduce the time required to display the document fragment models via the viewport 497. It should be appreciated that in alternate embodiments, the actions described with a particular component of the signal diagram 450 may be performed by a different component of the client device.

Figure 4E:
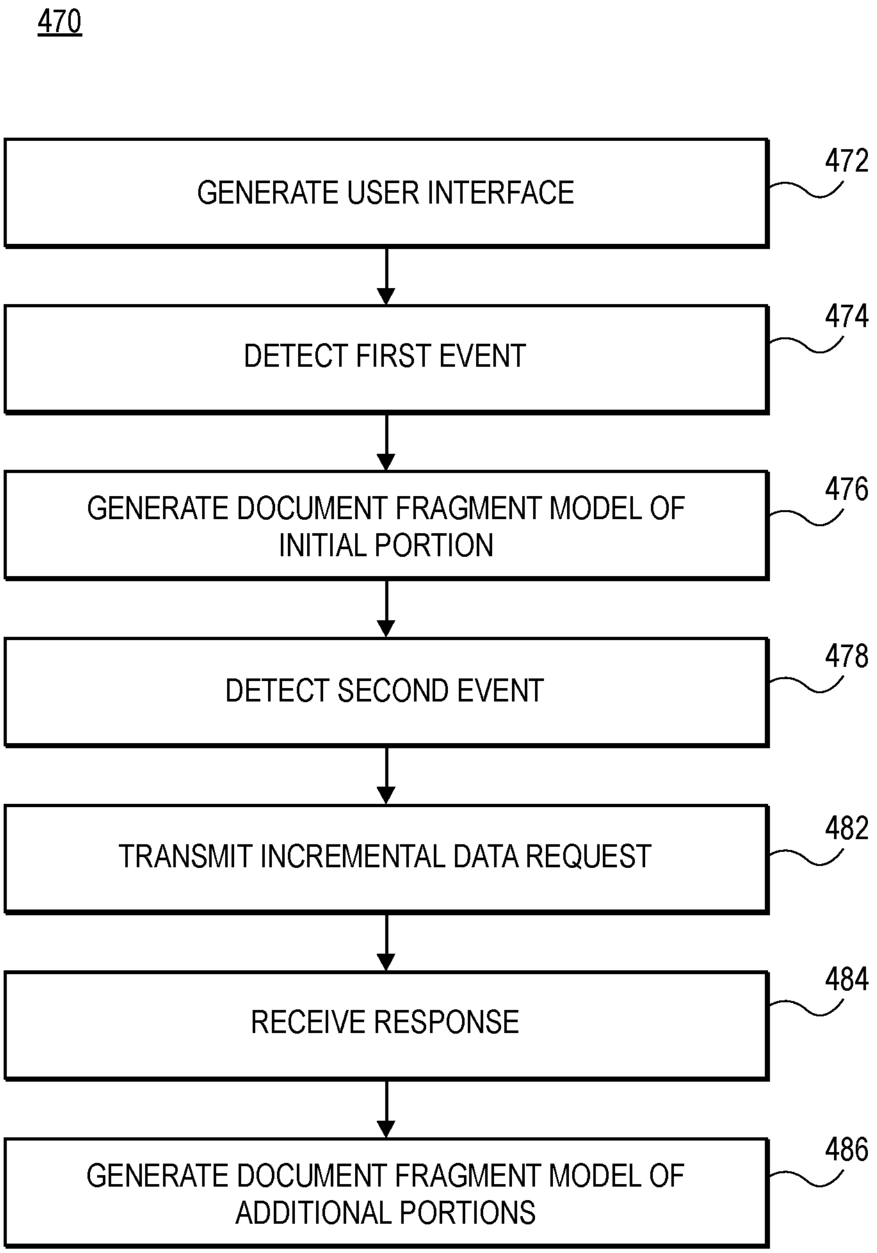
FIG. 4E illustrates an example flow diagram for low-latency incremental display of a document at a client device, according to an embodiment.

FIG. 4E depicts an example flow diagram 470 of a method for low-latency incremental display of a document (such as a document represented by a document model) at a client device (such as the client device 104 of FIG. 1). More particularly, the client device may execute one or more modules, including the modules 192-198 of FIG. 1, to perform the functionality associated with the flow diagram 470. It should be understood that the low-latency incremental display of the document may occur within 1 second, within 500 msec, or within 250 msec, or less, depending upon the particular implementation.

The method 470 may begin at block 472 when the client device generates a user interface that includes a viewport for displaying portions of the document. For example, the user interface may be one of the user interfaces 410, 420, or 430 of FIGS. 4A-4C. To generate the user interface, the client device may be configured to perform one or more functions described with respect to the viewer module 194 of FIG. 1 and/or step 452 of the signal diagram 450 of FIG. 4D.

At block 474, the client device detects a first event indicating that the document is to be viewed via the viewport. For example, the event may be a document navigation event indicating the document or an event generated in responses to an output of a search query or a learning algorithm (such as the relevancy algorithm maintained by the relevance module 148 of FIG. 1). To detect the first event, the client device may be configured to perform one or more functions described with respect to step 454 of the signal diagram 450 of FIG. 4D.

At block 476, the client device generates a document fragment model representative of an initial portion of the document, the initial portion including a first portion that is displayed upon the viewport being configured to display the document and one or more second portions that is not displayed when the viewport is initially configured to display the document. It should be appreciated that the document fragment models of the first and second portions do not need be generated concurrently. For example, the document fragment model of the first portion may be predictively generated as part of generating the user interface and the document fragment model of the second portion may occur responsive to detecting the first event. As described herein, generating a document fragment model of a particular portion of the document includes processing the corresponding portions of the object model to produce the document fragment model and storing the document fragment model of the particular portion of the document into in an data memory (such as the data memory portion of the memory 180 of FIG. 1) of the client device. To generate the document fragment model, the client device may be configured to perform one or more functions described with respect to the object processing module 193 of FIG. 1.

As described elsewhere herein, in some embodiments, the document is associated with metadata included in the object model that describes the document. For example, the metadata may indicate one or more regions of the document is associated highlighting, redactions, or annotations. Accordingly, when the client device generates document fragment models, the client device may do so in accordance with the metadata. That is, the document model fragment may include a component highlighting model, redaction model, or annotation model indicative of the highlighting, redactions, and annotations.

At block 478, the client device detects, via the user interface, a second event including an indication of the one or more second portions of the document. For example, the first portion of the document and the second portions of the document may be separated by a page break or other delimiter between document sections (e.g., slide breaks, slice breaks, tabs, etc.). Accordingly, the second event a navigation event associated with the page break (or other delimiter) being displayed in the viewport. It should be noted that "displaying" the page break (or other delimiter) does not necessarily entail the display of any data to the user, rather, simply that a context indicator for the viewport indicates that a location of the page break in the document is within the viewport. To detect the second event, the client device may be configured to perform one or more functions described with respect to step 462 of the signal diagram 450 of FIG. 4D.

At block 482 the client device transmits an incremental data request including an indication of one or more third portions of the document not included in the initial portion of the document. More particularly, the client device may transmit the incremental data request to a memory storing data associated with the document (such as the cache 160 of FIG. 1). In some embodiments, transmitting the incremental data request includes (1) determining a scroll speed associated with the viewport and based on the scroll speed, determining a size of the one or more third portions of the document requested by the incremental data request. That is, the faster user a scrolls, the more portions of the document are included in the one or more third portions of the document.

At block 484, the client device receives an incremental data response including the one or more third portions of the document. To transmit the incremental data request and receive the incremental data response, the client device may be configured to perform one or more functions described with respect to steps 464 and 464 of the signal diagram 450 of FIG. 4D, respectively.

At block 486, the client device generates, in response to receiving the incremental data response, a document fragment model of the third portions of the document. To generate the document fragment model, the client device may be configured to perform one or more functions described with respect to the object processing module 193 of FIG. 1 and/or step 468 of the signal diagram 450 of FIG. 4E. Accordingly, if the user scrolls past the second portion of the document such that the third portion of the document is viewable, a rendering of the third portions can be displayed in a low latency manner (e.g., in less than one second).

It should be appreciated that the method 470 may also include one or more clean-up steps for reducing the amount of storage required in data memory to implement the disclosed techniques. For example, the client device may be configured to determine that a portion of the document displayed via the viewport is at least a threshold distance from the second portions of the document (e.g., five segments, ten segments, twenty segments, and so on). In response, the client device may delete the document fragment models of the second portions of the document from the data memory. As another example, the client device may be configured to detect a third event indicating that another document is to be viewed via the viewport. In response, the client device may delete the document fragment models of the third portions (and, in some embodiments, the second portion) of the document from the data memory. In order to facilitate a low-latency navigation back to the originally displayed document, the client device may maintain document fragment model corresponding to the first portion (and, in some embodiments, the second portion) of the document.

It should be appreciated that other embodiments may include additional, fewer, or alternative functions to those described with respect to FIG. 4E. For example, functions described with respect to the other flow diagrams and/or signal diagrams described herein may be combined with the functions described with respect to the flow diagram 470.

V. Preloading of Object Models Embodiments

Figure 5A:
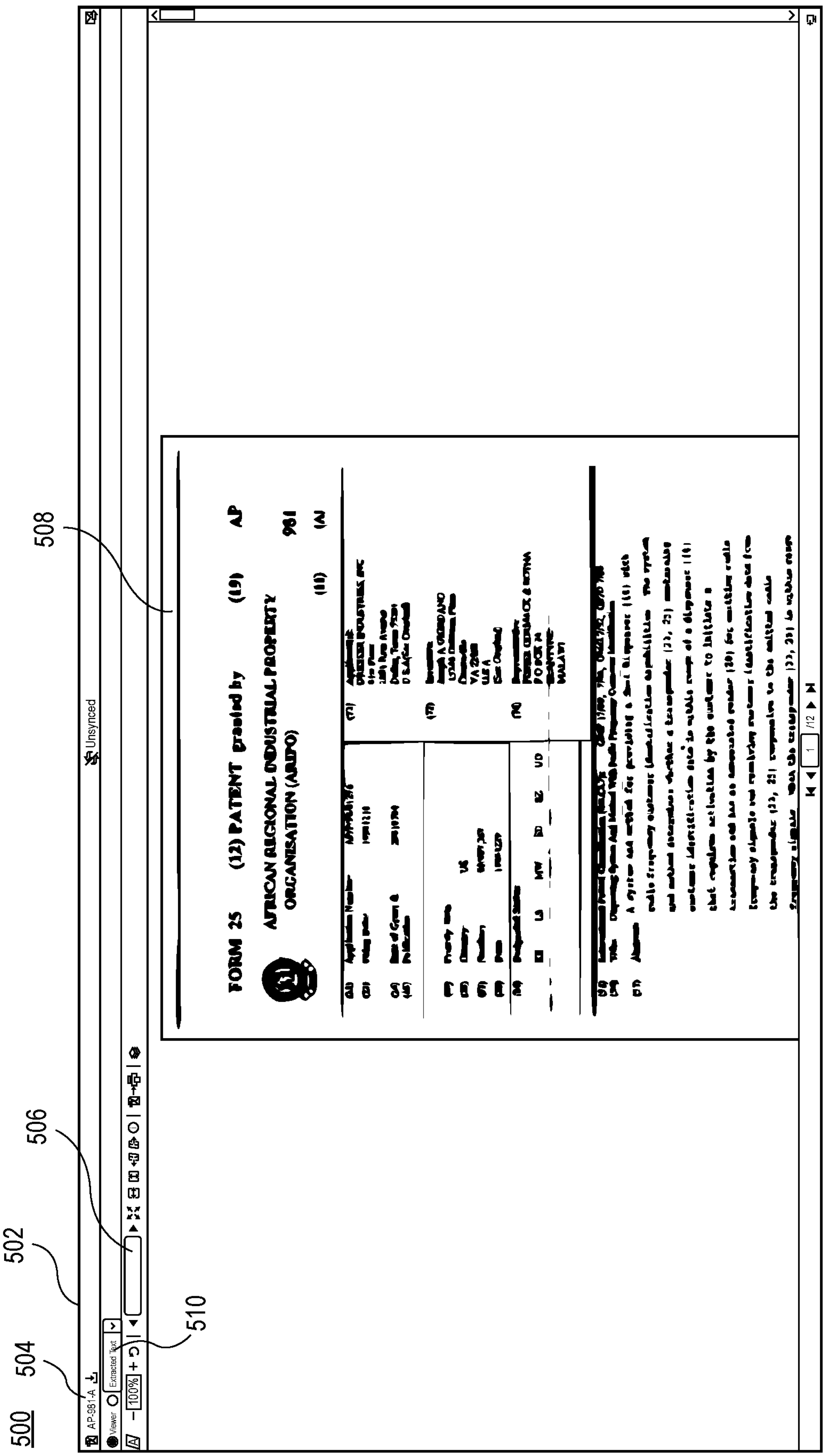
FIG. 5A illustrates an example user interface for preloading content at a client device, according to one embodiment.

FIG. 5A illustrates an example user interface 500 for preloading content at a client device, according to one embodiment and scenario. The user interface 500 may include a viewport 502, a document list 504, and a filter input 506. The user interface 500 may be a standalone document viewer that corresponds to the document viewer user interface 400 depicted FIG. 4A, for example. The user interface 500 may further include a rendered document 508 and a selection panel 510, in some embodiments.

Figure 5B:
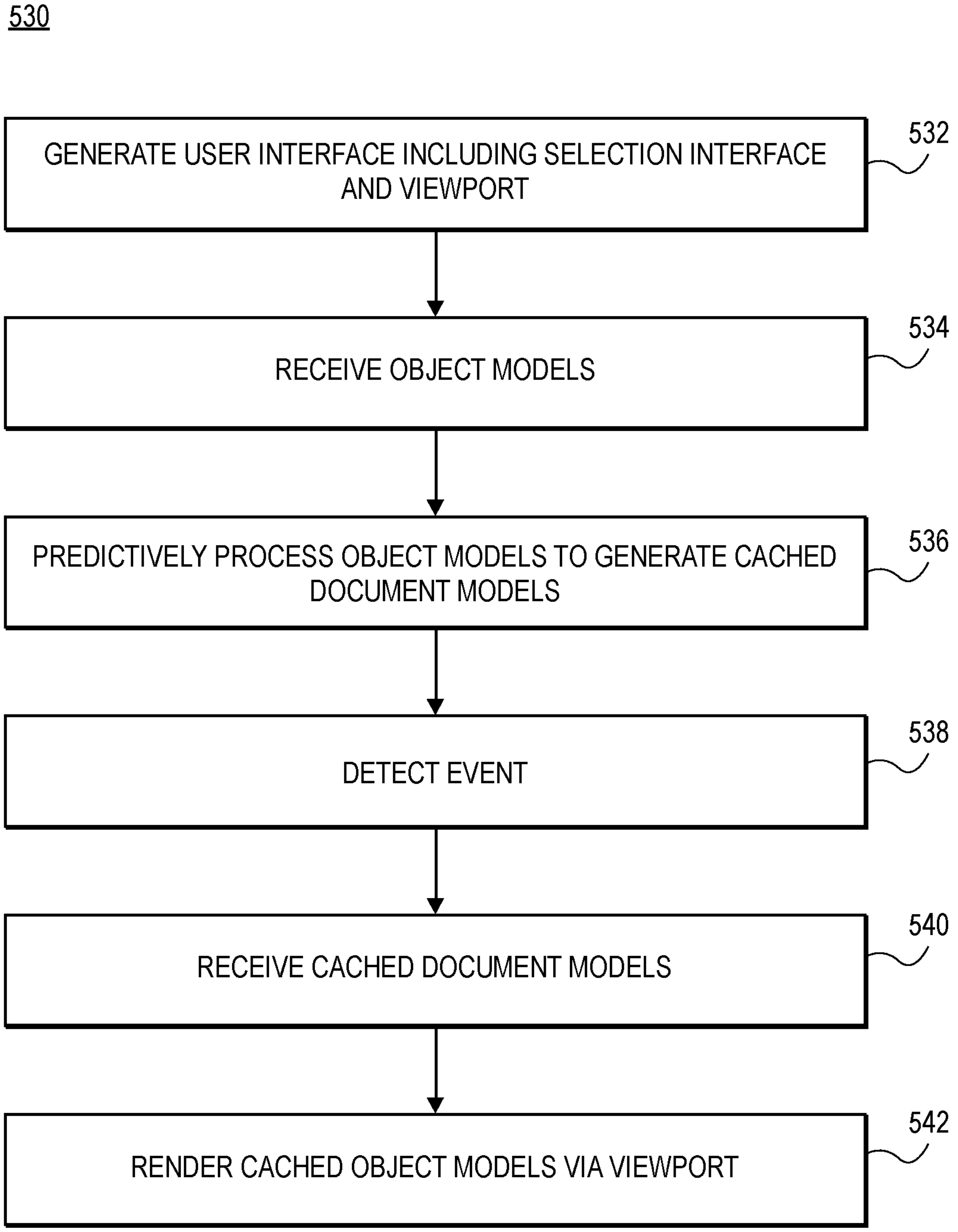
FIG. 5B illustrates an example computer-implemented method for preloading content at a client device, according to one embodiment.

FIG. 5B illustrates an example computer-implemented method 530 for preloading content at a client device, according to one embodiment and scenario. FIG. 5B will now be described with reference to FIG. 5A and FIG. 5C, which illustrates an example signal diagram 550 for preloading content at a client device, according to one embodiment and scenario.

Figure 5C:
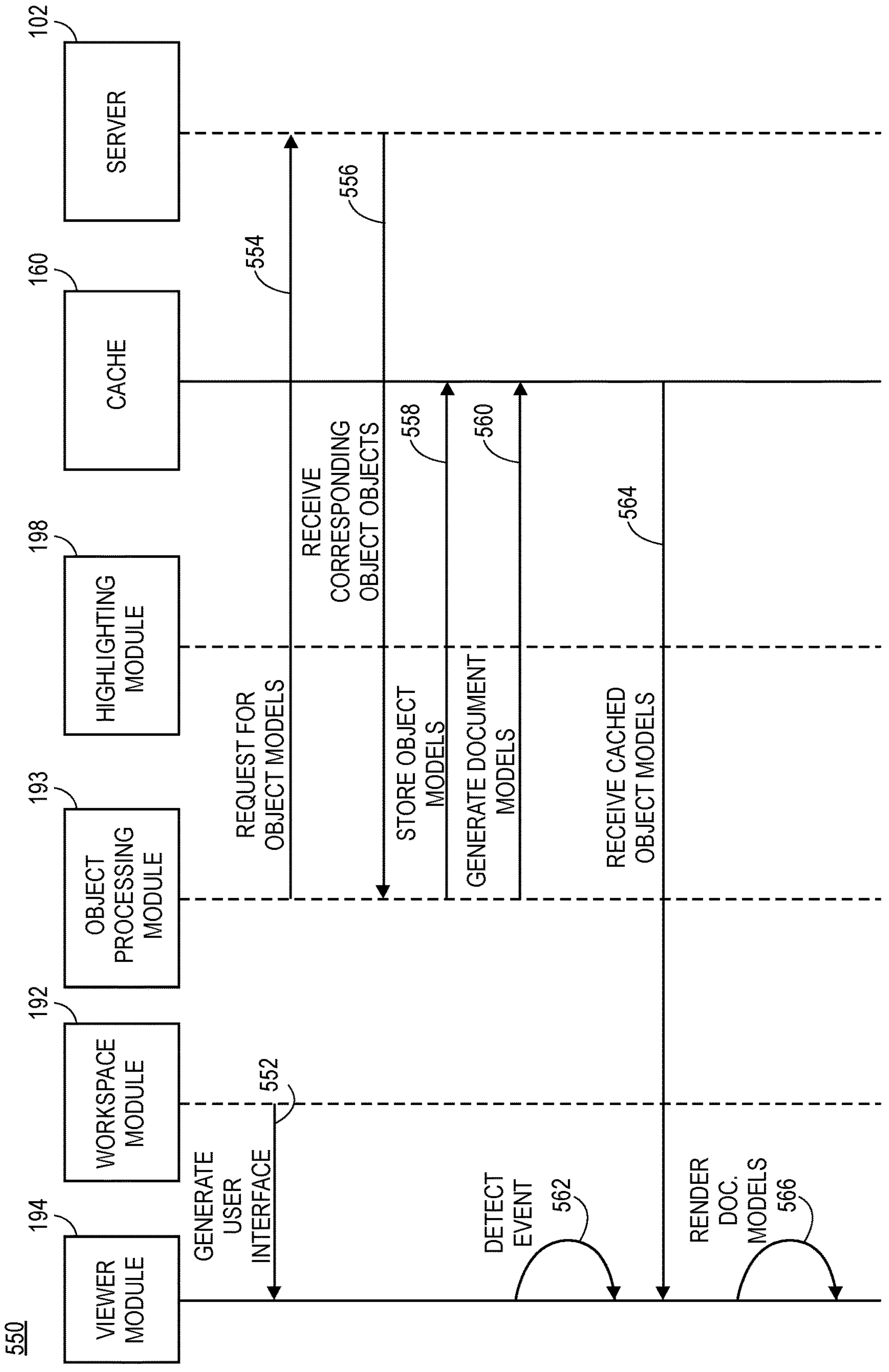
FIG. 5C illustrates an example signal diagram for preloading content at a client device, according to one embodiment.

The method 530 may include generating, by one or more processors of the client device, a user interface, wherein the user interface includes (i) a selection interface for selecting a current document from a list of documents, and (ii) a viewport configured to render documents (block 532). FIG. 5C depicts the workspace module 192 as performing the generating of the user interface and the viewer module 194 as causing display of the user interface. In some embodiments, the selection interface presents a list of documents, as shown in the document list 504 of FIG. 5A.

The method 530 may include receiving, from a server, a set of object models associated with one or more documents in the list of documents, the object models including respective metadata indicating how to render the object models (block 534). In some embodiments, the user interface (e.g., the user interface 500) is associated with a workspace (e.g., the viewport 502) that includes a database of object models maintained at the server (e.g., the object database 110). In such cases, the method 530 may include retrieving, by the one or more processors, the plurality of object models based upon at least one filter criterion applied to the database of object models. For example, the user may enter a filter (e.g., a keyword, string pattern, etc.) into the filter input 506 of the user interface 500.

In some aspects, the user interface 500 may include additional/other filter criteria (e.g., a reviewer assignment, a relevancy ranking, an object type, an object tag, an object relation, a keyword, and/or a regular expression). The method 530 may include transmitting, to a server, a request to retrieve a set of object models associated with the selection interface, wherein the object models include metadata indicating how a document model associated with the object model is to be rendered and displayed. The request, depicted as line 554, may include the search criteria, such that the received set of object models match the search criteria. The method 530 may include receiving, as shown in line 556, from the server, the set of the object models corresponding to the request. The method 530 may include receiving the requested set of object models. The method 530 may include storing one or more of the received object models in a local memory (e.g., in the cache 160), as depicted by line 558.

The method 530 may include prior to detecting an event, predictively processing one or more of the received object models to generate one or more corresponding cached document models (block 536). Line 560 depicts this processing. In some aspects, the predictive processing may be based upon a prediction (e.g., generated by a trained machine learning model) of which action a user is likely to take next, and thus, which object models are likely to be needed next for rendering. In some aspects, one or more received object model may be processed to generate one or more corresponding respective document models, each of which may include respective document fragment models as discussed herein. In some aspects, processing the object model(s) may include deserializing serialized raw data within each object model (e.g., structured or unstructured data represented in a flat file text format, a JSON format, etc.) into corresponding deserialized objects.

The method 530 may include detecting, by the one or more processors and via the selection interface, the event (block 538). Line 562 depicts this detection. The event may correspond to any suitable input, such as one or more keypresses, mouse movements, etc. In some aspects, the method 530 may include storing the generated document models in the cache 160 or in another location (e.g., in client-side storage via a Web Storage API).

The method 530 may include, based on detecting the event (i) receiving one or more of the cached document models associated with the event (block 540). Line 564 depicts this receiving. The method 530 may include, based on detecting the event, (ii) rendering the received one or more cached document models via the viewport in accordance with the respective metadata of the corresponding object models (block 542). Line 564 depicts this rendering. In some aspects, the processor 170 of the client device 104 may process a first one of the one or more document models to generate a rendering corresponding to a document (e.g., the document 508) to display in the viewport 502 in accordance with metadata. As discussed above, the metadata may include an indication of an author, a document source, a document date, a relevancy determined by an algorithm, a coding decision, and/or other attributes of the document. In some embodiments, the metadata may include objects that affect how the document is displayed, OCR properties, etc.

In some aspects, the method 530 may include processing, by one or more processors, one or more of the document models in accordance with the respective metadata to generate respective renderings of the one or more additional document models, which may be displayed in the viewport 502, as shown by line 558. The additional processing may occur in parallel to the processing of other document models. Specifically, the client 104 processors 170 may include a plurality of cores (e.g., two or more graphics processor units (GPUs)). Each of the cores may process document model at once to paint renderings of the headless document models objects suitable for display in a respective viewport (e.g., the viewport 504 and a viewport containing the rendered document 508).

The method 530 may include generating, by the plurality of cores, a respective rendering for an initial portion of the additional document models. For example, in some embodiments, the method 530 may include rendering a number (e.g., 16) of additional document models in the document list 504. In some embodiments, the additional rendering may be performed on a document basis in addition to, or alternative to, the number of document models (e.g., the first N document models or the next M document models). The number of document models to render in advance may be configured dynamically, in accordance with available processing cores and/or memory in the client 104. This dynamic behavior advantageously allows the present techniques to control rendering of document models into documents in accordance with user demands, without overwhelming server computational/storage resources. Of course, the rendering of document models need not be performed in any particular order. For example, the method 530 may include rendering a document model associated with a first document listed before a second document in the list of document models.

It should be appreciated that the present techniques generally improve the state of document review systems, by the introduction of document models that allow modules (e.g., the object processing module 193 of FIG. 1) to obtain document metadata (e.g., a number of pages, a page-by-page index, RSMF data including document participants and conversations), to track changes, to examine email attachments, to perform highlighting, to perform searches, and so forth, without opening a document. As shown in the method 530, the document models can be accessed and processed on the server-side and/or the client-side. Furthermore, the pre-fetching capabilities of the present techniques advantageously allow the client computing device 102 to only download those object models that are necessary to display portions of the document that the user has requested, or is likely to access, in dynamic fashion.

Unlike conventional approaches, that as noted involve synchronous waiting/application blocking, the pre-fetching and processing of object models described herein is advantageously performed asynchronously, such that to the user, documents appear to be displayed instantaneously or with negligible delay. Those of ordinary skill in the art will appreciate that the amount of acceptable processing and/or display delay may vary according to the number of users, respective load and other factors, such as hardware. For example, acceptable delay may be less than 500 ms, less than 250 ms, less than 100 ms, less than 30 ms, etc. depending on several factors. The pre-fetching of object models as described in method 530 advantageously results in very little waiting for documents to be loaded when a user moves from document to document, because the entire document does not need to be loaded into memory before any rendering/display can occur. That is, unlike a conventional application paradigm such as Microsoft word, pre-loading portions of documents (e.g., via one or more object models) means that user navigation occurs with imperceptible, or no, latency. Because the present techniques may load only the object models that are necessary to display the requested documents, and/or those likely to be requested, only the object models corresponding to the parts of the document 508 that are necessary to perform rendering of the portion of the document in the viewport may be fetched from the server. Further, whereas conventional browser techniques only allow a single document to be displayed at once, the present techniques allow multiple viewports to be loaded with respective documents, making cache misses, paint swapping and other unfavorable/latency-causing conditions from occurring, and advantageously improving overall user experience.

VI. Systems and Methods of Previewing a Headless Object

Some embodiments relate to previewing a document (e.g., on a display of client device 104).

Figure 6A:
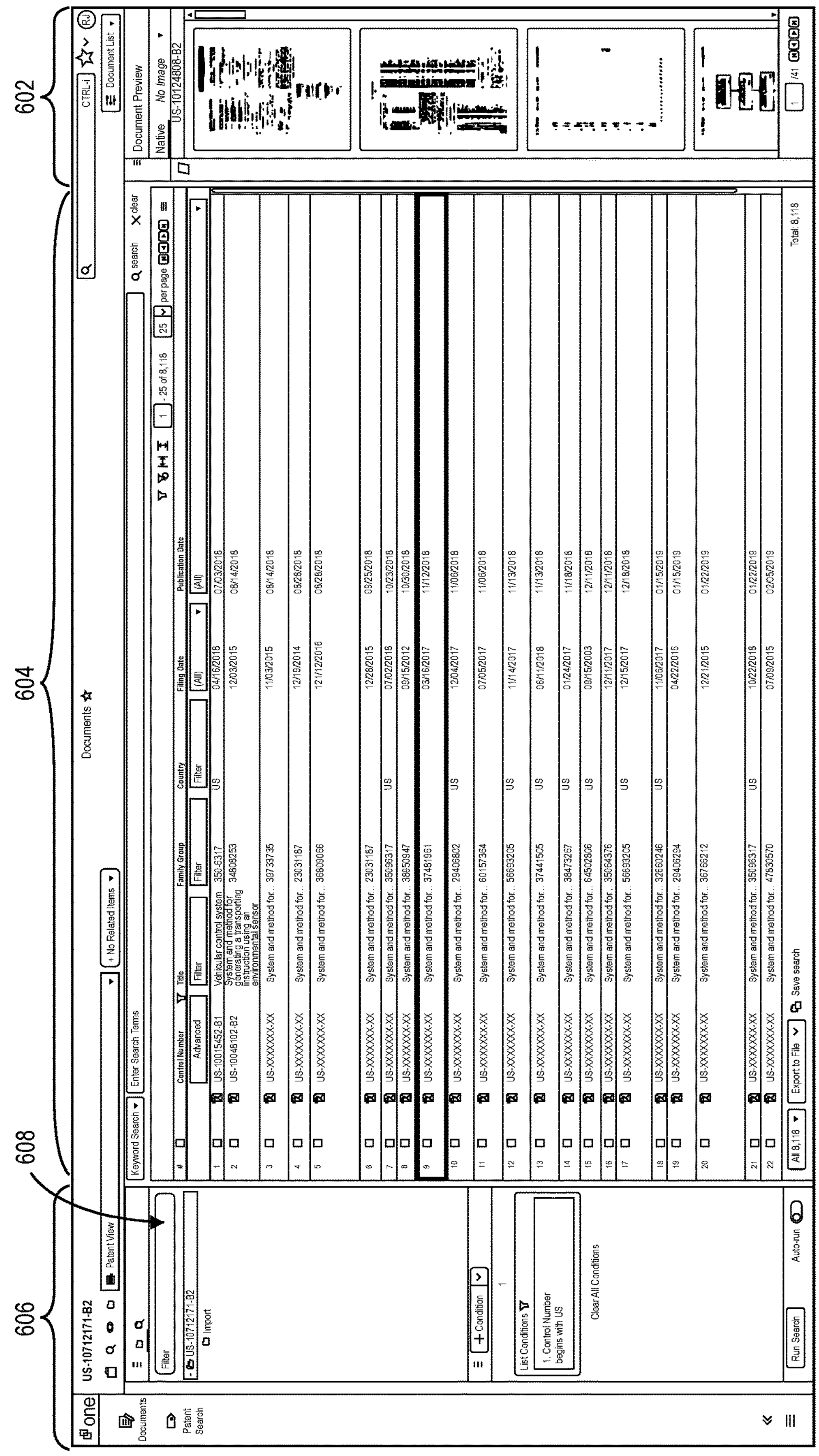
FIG. 6A illustrates an example of a primary user interface including a first viewport populated with thumbnails, according to an embodiment.

In this regard, FIG. 6A illustrates an example primary user interface 600, which may be displayed on the client device 104. The example primary user interface 600 includes a first viewport 602, which may be used to preview documents (e.g., in thumbnail form, or any other form). The first viewport 602 may include a first object focus (e.g., the portion of the viewport displayed on the example screen 600, which may change as the user scrolls through the pages of the document). Put another way, in some implementations, the first viewport 602 may be configured to display a rendering of a document model corresponding to the first object focus.

The first interface 600 may further include a selection table 604. In some embodiments, the selection table 604 includes a list of documents, and/or information about the documents. For instance, as in the example of FIG. 6A, when the documents are patent documents, the information of the documents may include a control number, title, family group, country, filing date, publication date, etc.

In some embodiments, a selection from the selection table 604 controls what is displayed in the first viewport 602. For instance, a first event, such as a user clicking on a document from the list of the selection table 604, may cause the selected document to be displayed (e.g., in thumbnail form) in the first viewport 602. In this regard, the selection table 604 may function as a selection interface included in the primary user interface 600.

The first interface 600 may still further include a panel 606. In some embodiments, the panel 606 may include an input box 608, which a user may use to enter filter criteria, a search query, etc., and which will be further explained below.

Figure 6B:
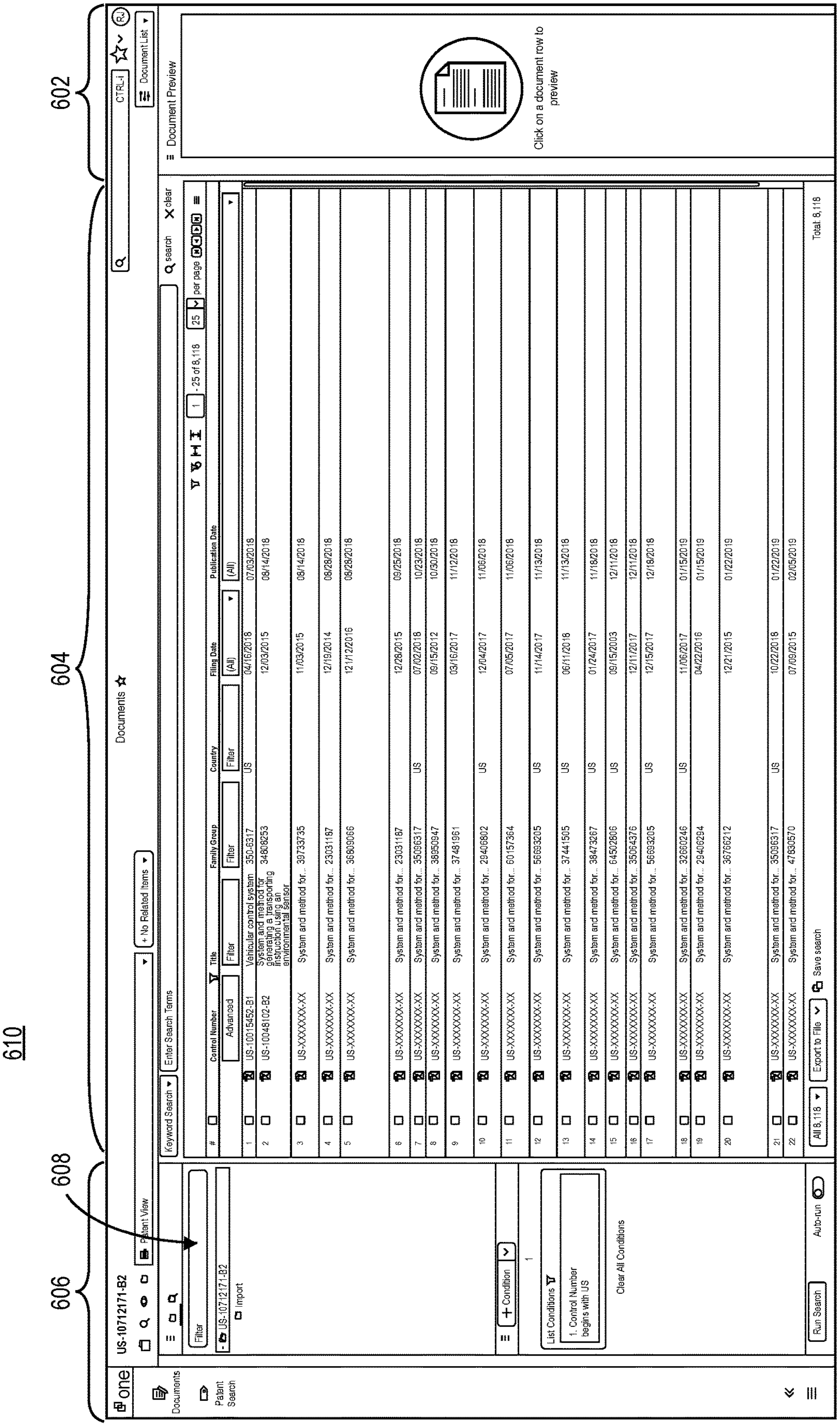
FIG. 6B illustrates an example of a primary user interface including an unpopulated first viewport, according to an embodiment.

FIG. 6B shows another example primary interface 610. However, in the example of primary interface 610, the first viewport 602 is unpopulated.

Figure 6C:
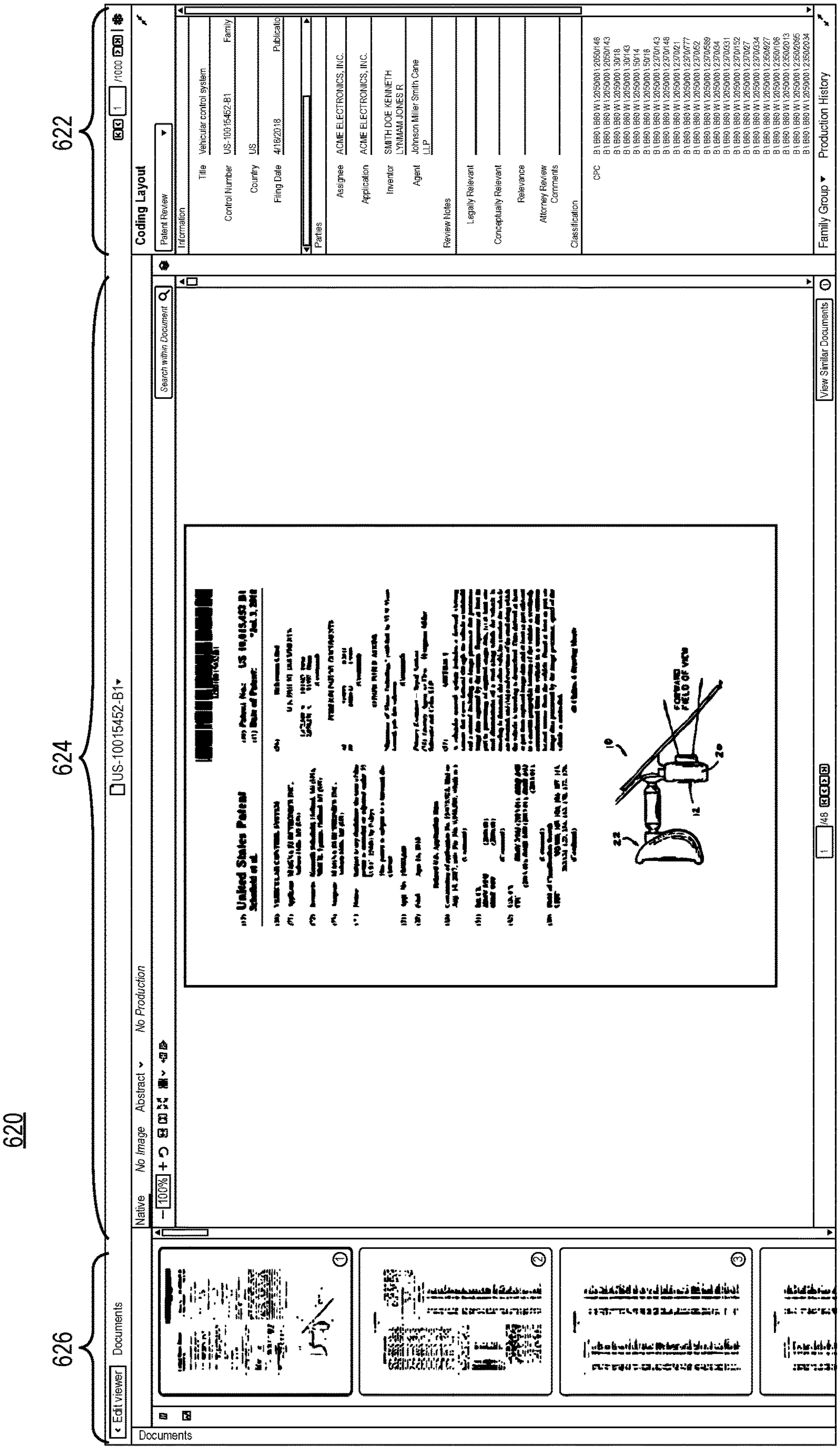
FIG. 6C illustrates an example secondary user interface, according to an embodiment.

FIG. 6C shows an example secondary interface 620 (e.g., to be displayed on the client device 104). In this regard, in some embodiments, a user may switch between the primary interface 600, 610 and the secondary interface 620. In one example, a second event, such as the user clicking on a document in a list (e.g., in the selection table 604), triggers a switch in display of the primary user interface to the secondary user interface. In some embodiments, and as will be further explained below, the secondary user interface includes a first viewport 622, a second viewport 624, and a panel 626.

Figure 6D:
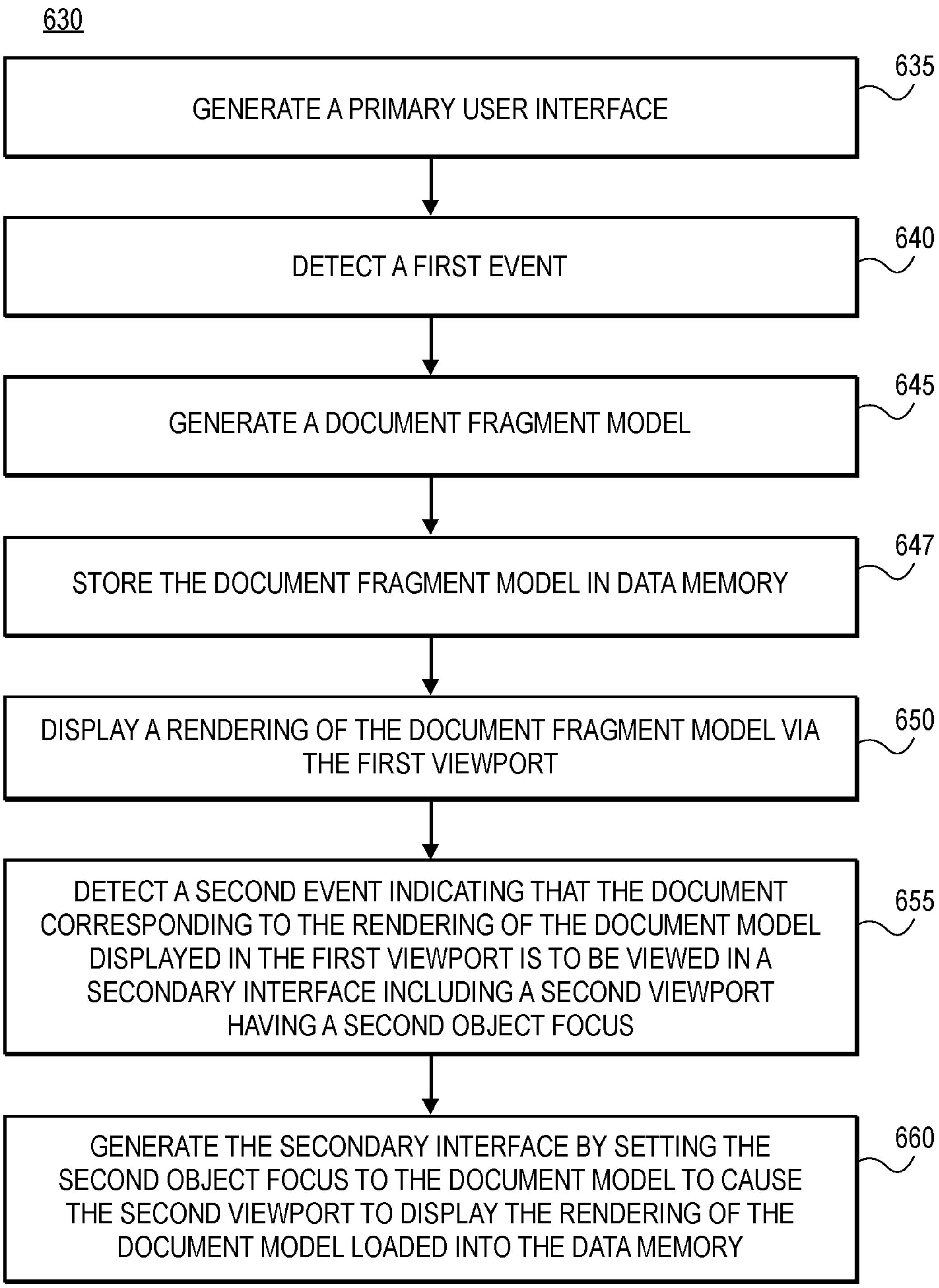
FIG. 6D illustrates an example method of previewing content at a client device, according to an embodiment.

To further illustrate, FIG. 6D depicts an example method 630 of previewing content at a client device, such as the client device 104 of FIG. 1. With reference thereto, at block 635, a primary user interface, such as the primary user interface 600, 610 is generated. In this regard, in some embodiments, the viewer module 194 may be configured to interact with the interface identification module 142 of the server 672 (such as the server 102 of FIG. 1) to obtain a user interface framework and/or populate data indicated by a local or remote user interface framework to thereby generate the primary user interface 600, 610.

In some embodiments, the generated primary user interface 600, 610 includes a first viewport 602 having a first object focus, and the first viewport may be configured to display a rendering of a document model corresponding to the first object focus. For example, a user may click on a document in the list of documents in the selection table 604, and thumbnails of the object may populate into the first viewport 602.

Figure 6E:
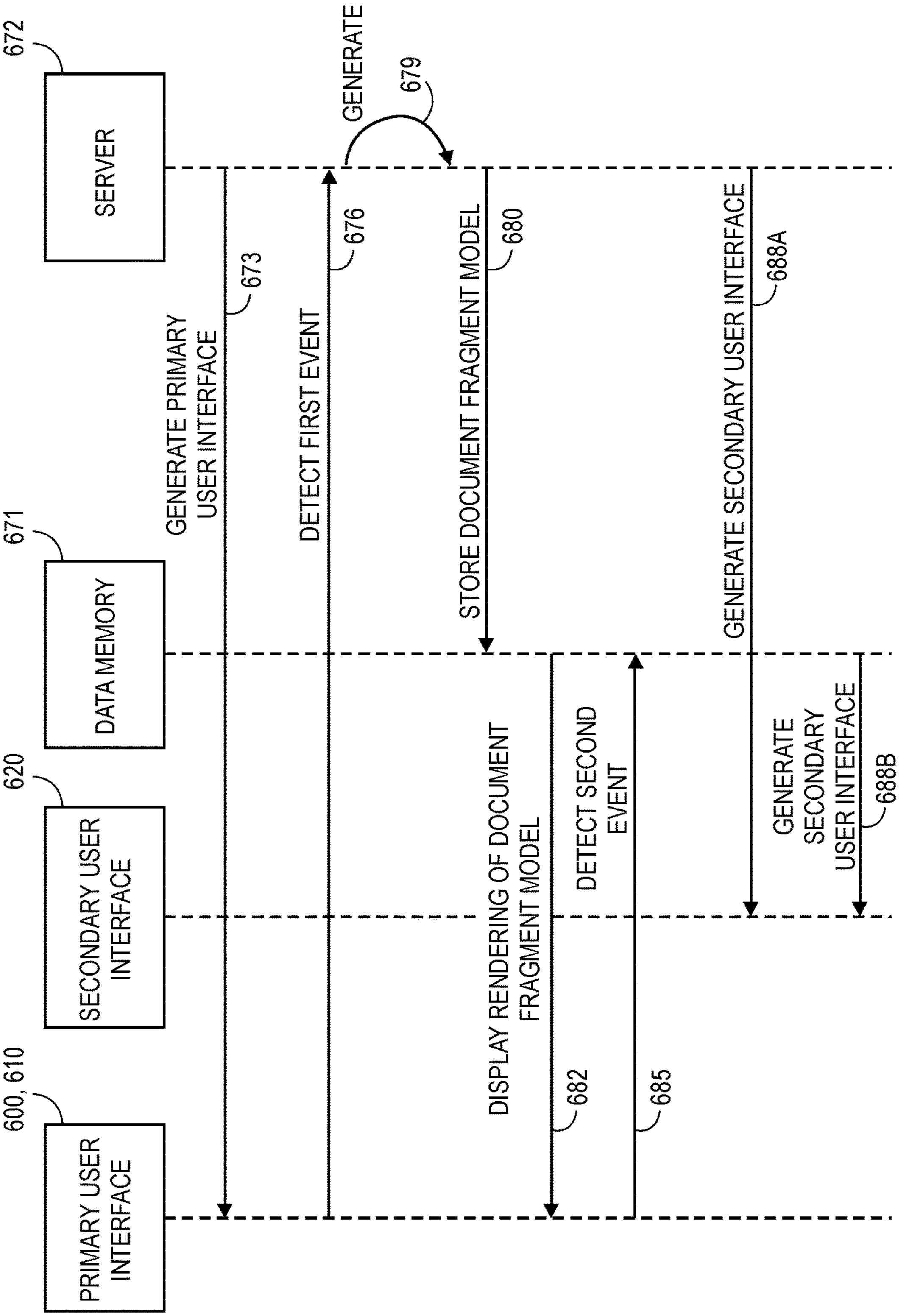
FIG. 6E illustrates an example signal diagram for previewing content at a client device, according to an embodiment.

To even further illustrate, FIG. 6E depicts an example signal diagram 670 for previewing content at a client device. In some aspects, the example signal diagram 670 of FIG. 6E corresponds to the example method of FIG. 6D (e.g., line 673, in some aspects, corresponds to block 635), but the example signal diagram 670 further illustrates some aspects of interactions between components.

At block 640, as well as line 676, a first event is detected. In some embodiments, the first event indicates that the first object focus of the viewport is to be set to a document model corresponding to a document object. In some implementations, the detection of the first event includes detecting an event generated in response to an output of a search query or a learning algorithm.

For example, a user may enter a search query or filter criteria into the input box 608. For instance, in one patent-related example, a user enters the search term "widget" into the input box 608, thereby generating the first event. As will be explained further below, this ultimately triggers display (and optionally highlighting, redaction, etc.) of documents containing or relevant to the term "widget." Further regarding this example, upon entry of the term "widget" (e.g., generation of the first event), in some implementations, the client device may automatically take the most relevant search result of a search for the term "widget" to become the document associated with the first object focus.

Additionally or alternatively, a machine learning technique may generate the output that is used to generate the first event. For example, a machine learning algorithm may generate search term(s) (e.g., the output that triggers the event) based on a user's prior search history, search history data from other users, etc. If data from other users is used, the data may be anonymized. Techniques for the machine learning model may include gradient boosting, neural networks, deep learning, linear regression, polynomial regression, logistic regression, support vector machines, decision trees, random forests, nearest neighbors, or any other suitable machine learning technique.

In this regard, in some implementations, the client 104 coordinates with the server 672. For instance, the workspace module 148 may receive a content-based query and a time-based query to reduce a patent document database from a corpus of over 10 million documents to a set of about 300,000 most relevant documents. Accordingly, the workspace module 148 may store documents associated with the workspace (and their corresponding metadata) into an object database 110. In this regard, the client 104 generates the search terms (e.g., by a user entering input into input box 608), yet the corpus and most relevant documents are stored at the server 672.

Additionally or alternatively, the first event may be detected by a selection of the document via a selection interface (e.g., the selection table 604) included in the primary user interface 600, 610. For instance, a user may simply click on a document from a list of the selection table 604, which thus causes the detection of the first event.

At block 645, as well as line 679, the server 672 generates a document fragment model. The document fragment model may correspond to only a portion of the document (e.g., a single page of the document). In some embodiments, the document fragment model corresponds to an initial portion of the document. In one example, the document fragment model may be generated based on metadata, such as metadata indicative of information associated with how a rendering of the document model is to be displayed.

At block 647, as well as line 680, the generated document fragment model is stored in an data memory 671 of the client device 104 (e.g., by the object processing module 193). In some embodiments, the data memory 671 is a portion of the memory 180. In some embodiments, the data memory 671 is partitioned away from other portions of the memory 180.

At block 650, as well as line 682, a rendering of the document fragment model is displayed in the first viewport 602 (e.g., by the viewer module 194). In some embodiments, a user may control the display by use of scrolling or by dragging an image. As explained in other portions of this disclosure, the loading of the document fragment model into in an data memory 671 of the client device 104 (e.g., at block 645) prior to the display (e.g., at block 650) advantageously reduces the time that the user will have to wait to view the document. This is particularly beneficial when a large number of documents must be viewed because the time saved per document, when aggregated, may be quite large.

At block 655, as well as line 685, there is a detection (e.g., by the workspace module 192) of a second event indicating that the document (e.g., the document corresponding to the document fragment model) displayed in the first viewport 602 is to be viewed in a secondary interface 620 including a second viewport 624 having a second object focus. In this regard, the second viewport 624 may display a page of the document (e.g., a further document fragment) with a larger view that was displayed in the primary user interface 600, 610, thereby allowing the user to more easily read the text of the document. To further illustrate, in one example, the document fragment model of block 645 (e.g., a first document fragment model) corresponds to an initial portion of the document; and, an additional document fragment model (e.g., a second document fragment model) may be generated (e.g., in response to the detection of the second event) to represent an additional portion of the document.

In some embodiments, in response to the detection of the second event, the client device 104 transmits an incremental data request to the cache 160 including the indication of one or more portions of the document not included in the document fragment model. In this regard, the incremental data request may be used to initiate processing additional portions of the object model corresponding to the document. And, the server 672 may be used to process the object model to generate additional document fragment models to load into the cache 160. The use of the incremental data request (s) advantageously allows for still faster viewing of the relevant portion(s) of the documents.

At block 660, as well as lines 688A and 688B, the secondary interface 620 is generated by setting (e.g., by the viewer module 194) the second object focus to the document model to cause the second viewport 624 to display the document model loaded into the data memory 671 (e.g., line 688B). Furthermore, in this regard, the viewer module 194 may be configured to interact with an interface identification module 142 of the server 672 to obtain a user interface framework and/or populate data indicated by a local or remote user interface framework (e.g., line 688A).

In some implementations, the generation of the secondary user interface 620 displays the rendering of the document model in the second viewport within a predetermined timeframe (e.g., 5 msec) of detecting the second event. By generating the second viewport within a specific predetermined timeframe, the time taken to view each document is still further advantageously reduced.

In some embodiments, the generating the second viewport 624 of the secondary interface 620 includes resizing or relocating the first viewport 602 of the primary user interface 600, 610 to a size or a location associated with the secondary user interface 620. For instance, regarding the resizing, the client device 104 may control a horizontal and/or vertical length of the viewport 602. The client device 104 may also relocate the viewport 602, which will correspondingly result in a change of the size and/or location of one or both of the selection table 604, and/or panel 606.

In some embodiments, contemporaneous to the generation of the secondary interface 620, the client device 104 loads a second document model into the data memory 671. In this regard, the second document model may be selected based upon a relationship criteria associated with the document model. For instance, a machine learning algorithm may determine a relationship between the document model and the second document model. Techniques for the machine learning algorithm may include gradient boosting, neural networks, deep learning, linear regression, polynomial regression, logistic regression, support vector machines, decision trees, random forests, nearest neighbors, or any other suitable machine learning technique. In this way, the user may be presented with the documents in the most relevant order. Advantageously, this will help to ensure that, if the user does not have sufficient time to review every document, the most relevant documents have been reviewed.

In some implementations, the object model and/or document model may include metadata, and the metadata may include a first set of metadata indicative of information associated with how the document model is to be displayed. In this regard, the loading of the document model into the data memory 671 (e.g., at block 645) may include generating the document model in accordance with the metadata. In some embodiments, the first set of metadata may include a highlighting model, a redactions model, and/or an annotation model. (Further elaboration on highlighting, redactions, and annotations is made elsewhere in this disclosure). In some embodiments, additionally or alternatively, the metadata includes a second set of metadata indicative of a source of the document, a coding decision associated with the document, a score assigned to the document, a machine learning algorithm, and/or information entered via a client device 104. In some implementations, the secondary interface is configured to display at least a portion of the second set of metadata.

In some embodiments, the entire example method 630 may be performed by one or more processors of the client device 104 (e.g., the processor 170). However, any component may perform any block of the example method; for example, any or all of the blocks of the example method 630 may be performed by the server 672 and/or additional client device(s) (not illustrated in FIG. 1).

Furthermore, it should be understood that, although the examples of FIGS. 6A-6C illustrate examples including patent documents, any type of documents may be used.

VII. Systems and Methods for Contextual Highlighting of a Document

Some embodiments relate to contextual highlighting of a document. Some additional and/or alternative embodiments relate to contextual redaction and/or annotation of a document.

Figure 7A:
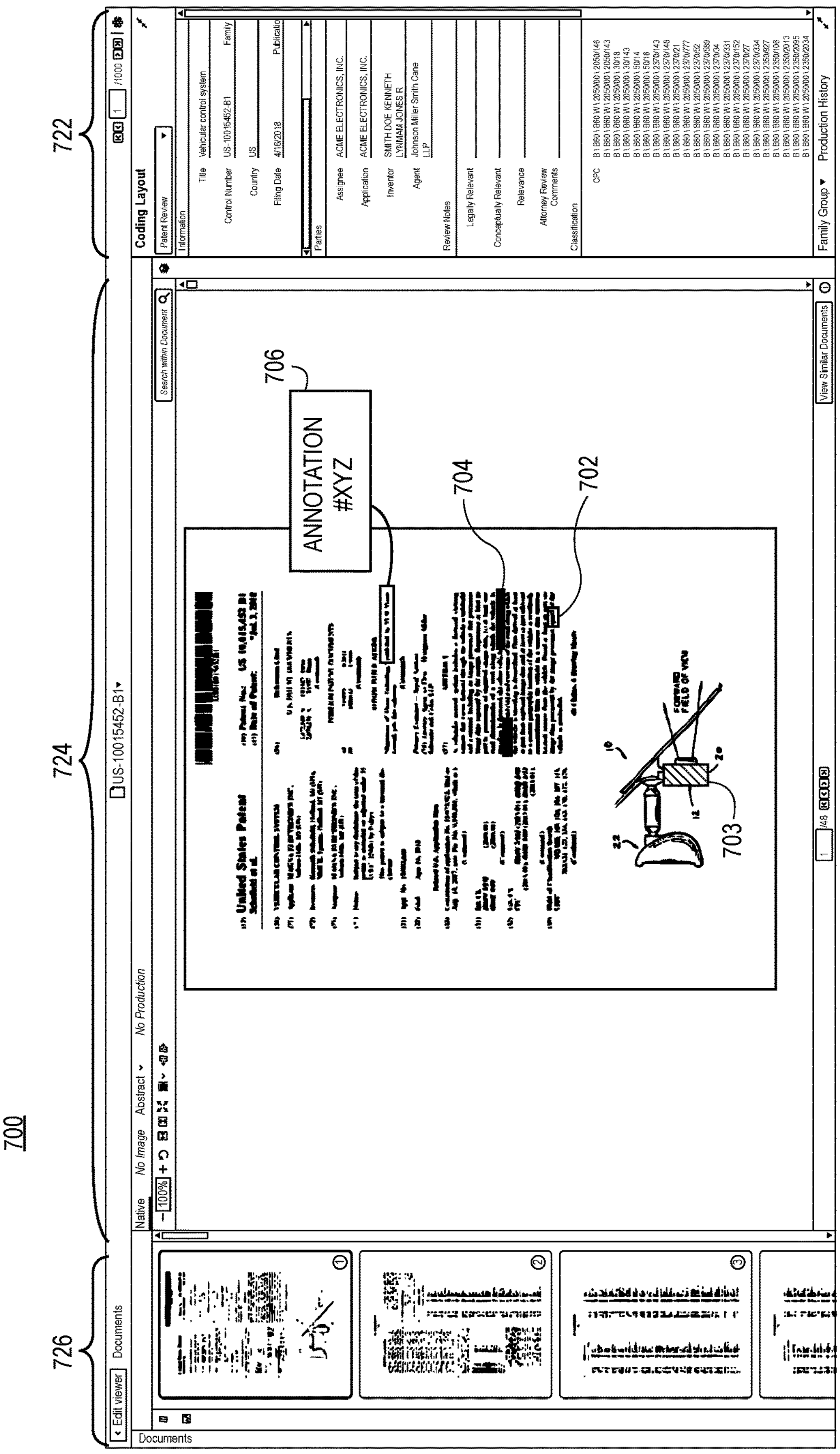
FIG. 7A illustrates an example secondary user interface including example text highlighting, drawing highlighting, redaction, and annotation, according to an embodiment.

In this regard, FIG. 7A illustrates an example primary user interface 700, which may be displayed on the client device 104. In some respects, the example primary user interface 700 is similar to the example primary user interface 620 of FIG. 6C; however, the primary user interface 700 further includes text highlighting 702, picture highlighting 703, redaction 704, and annotation 706. Somewhat similarly to the example of FIG. 6C, the example of FIG. 7A illustrates a first viewport 726, a second viewport 724, and a panel 726.

Figure 7B:
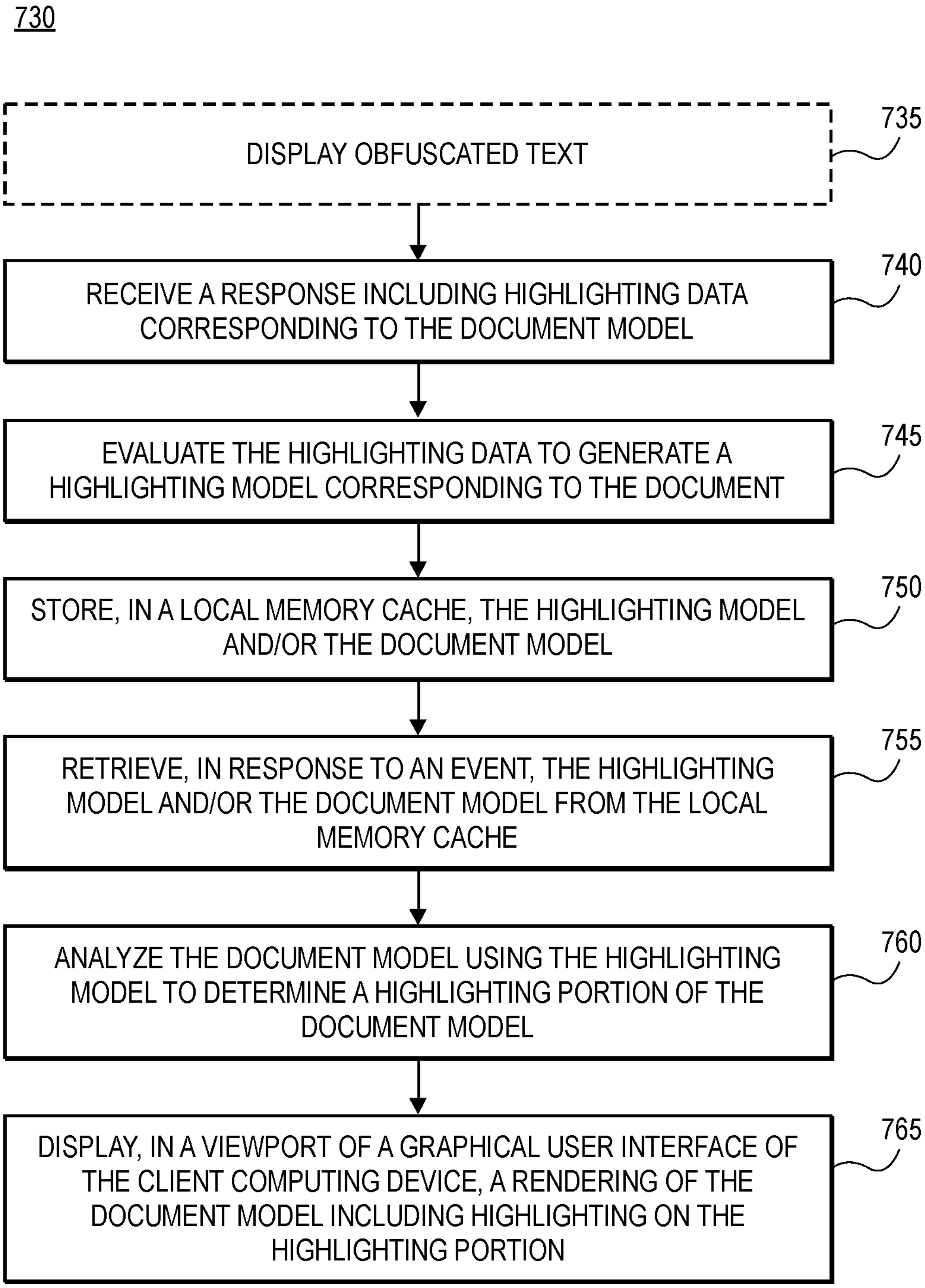
FIG. 7B illustrates an example method of contextual highlighting of a document model, according to an embodiment.

To further explain, FIG. 7B illustrates an example method 730 for performing contextual highlighting of a document at a client computing device 104. And, to even further illustrate, FIG. 7D depicts an example signal diagram 7000 for contextual highlighting of a document. In some aspects, the example signal diagram 7000 of FIG. 7D corresponds to the example method of FIG. 7B, but the example signal diagram 7000 further illustrates some aspects of interactions between components.

With reference to FIG. 7B, at block 735, optionally, obfuscated text may be displayed. For instance, any or all of the text shown in any of the documents illustrated in the example primary user interfaces 600, 610 or the secondary user interfaces 630, 700 may be displayed as obfuscated (although the example FIGS. 6A-6C or 7A do not show the text as obfuscated).

With continuing reference to FIG. 7B, and additional reference to FIG. 7D, at block 740, as well as line 7020, the client device 104 receives (e.g., with the object processing module 7003, such as the object processing module 193 of FIG. 1) a response from the server 7006 (such as the server 102 of FIG. 1). In some embodiments, the server 7006 sends the response responsive to a request from the client device 104. For instance, as illustrated by line 7010 of FIG. 7D, the workspace module 7002 (such as the workspace module 148, or the workspace module 192 of FIG. 1) may send a request to the server 7006.

The response, received by the object processing module 7003, may include highlighting data corresponding to the document. In some embodiments, the text is displayed as obfuscated (e.g., from optional block 735) only until the receiving of the response including the highlighting data is complete (e.g., block 740 is complete). In some embodiments, the highlighting data includes a search term that a user has searched for (e.g., by entering the term into the input box 608).

In some embodiments, the highlighting data includes search terms generated by a machine learning algorithm. For example, a machine learning algorithm may generate search term(s) based on a user's prior search history, search history data from other users, etc. If data from other users is used, the data may be anonymized. Techniques for the machine learning model may include gradient boosting, neural networks, deep learning, linear regression, polynomial regression, logistic regression, support vector machines, decision trees, random forests, nearest neighbors, or any other suitable machine learning technique.

In some embodiments, the search terms included in the highlighting data may also be particular terms defined in the workspace module 7002 (such as either of the workspace modules 148, 192). Examples of these terms include: a party to a case, a company name, a word associated with a key bit of evidence, etc. In some embodiments, the highlighting data may be associated with the workspace module 7002, and propagated to each object (e.g., by sending them to the object generation module 144).

At block 745, as well as line 7030, the highlighting data is evaluated (e.g., at the object processing module 193) to generate a highlighting model corresponding to the document that is included in the document model for the document. For example, the generated highlighting model may indicate the specific word(s) to be displayed as highlighted. For instance, in the example of FIG. 7A, the word 702 "speed" is highlighted.

At block 750, as well as line 7040, the highlighting model and/or a document model corresponding to the document is/are stored in a local memory cache 7005 (such as the cache 160 of FIG. 1).

At block 755, as well as line 7050, in response to an event, the highlighting model and/or document model is/are retrieved (e.g., by the highlighting module 7004, such as the highlighting module 198 of FIG. 1) from the local memory cache 7005. Advantageously, retrieval from the cache 7005 is faster than from, for example, the server 7006. In this regard, the storing/retrieval of the highlighting model to/from the cache 7005, as described herein, allows for faster and more efficient document viewing than in previously known systems.

In some embodiments, the event is an event caused by a user of the client computing device 102, for example, the user clicking on a document from the list of the selection table 604. In this regard, the retrieving of the highlighting model and/or document model object from the local memory cache 160 may include selecting the highlighting model and/or document model based on the event caused by the user (e.g., selecting the document model corresponding to the document that the user clicked on). Additionally or alternatively, the event may be a search query event, and the selecting may include selecting the highlighting model and/or document model based on one or more criteria included in the search query event. In one example, the search query event comprises the user entering text into input box 608.

At block 760, as well as line 7060, the document model is analyzed (e.g., by the highlighting module 7004) using the highlighting model to determine a highlighting portion of the document model. In some embodiments, the analyzing the document model using the highlighting model to determine a highlighting portion of the document model includes imposing metadata included in the highlighting model onto a subset of the document model for subsequent display thereof. In some implementations, the metadata may include: information associated with how the document model is to be displayed; information indicative of a source of the document model; a coding decision associated with the document model; a score assigned to the document model; a machine learning algorithm; and/or information entered via a client device 104. In some implementations, the secondary interface is configured to display at least a portion of the metadata.

The subset of the document model (which, in some examples, the metadata may be imposed upon) may include text and/or graphics/pictures/drawings (for purposes of this disclosure, the terms "graphics," "pictures," and "drawings" are used interchangeably). For instance, in the example of FIG. 7A, both text and a drawing have been highlighted, and are thus included in the subset of the document model. In particular, the example of FIG. 7A illustrates the word 702 "speed" highlighted, and further illustrates a portion highlighted picture portion 703.

Regarding the determination of a highlighting portion for text highlighting (performed, e.g., by the highlighting module 7004), in some embodiments, only the specific word of a search term is highlighted. For example, entry of the search term "speed" results in only the word "speed" being highlighted. In other embodiments, other words related to the specific search term word may be highlighted as well. For instance, the plural of the word may be highlighted (e.g., the user enters the word "speed," and the system highlights "speeds" as well). Additionally or alternatively, synonyms, approximate synonyms and/or other variations of the word may be highlighted as well. For instance, in the "speed" example, the word "velocity" may be highlighted as well. Additionally or alternatively, translations of words into different languages may be highlighted as well.

In some embodiments, entire portions of text (e.g., a complete sentence, a complete paragraph, etc.) is highlighted rather than simply one word. For example, if a user searches for "transistor," any paragraphs including the word "transistor" are highlighted.

Any suitable technique may be used to store locations of highlights, redactions and/or annotations. In some embodiments, text highlights, redactions, and/or annotations may be indicated by their starting and ending text character offset or word offset into the text of the document. For example, a highlight may start at text character offset 150 and end at text character offset 158. Additionally or alternatively, rectangular highlights and redactions may be indicated by their coordinates (e.g., pixel coordinates) on the page (left, top, right and bottom). Additionally or alternatively, cell highlights, redactions and/or annotations may be indicated by their sheet and cell range. For example, a highlighting portion indicated by sheet 3, columns 5-7 and rows 10-11.

Each highlight, redaction and annotation may be stored as an object in the document model. In some embodiments, the highlighting model further serves as a redaction model (e.g., performs highlighting in the same color as the text). In some embodiments, there may be a redaction module separate from the highlighting module. In some embodiments, there is an annotation model indicative of location in the document at which the annotation is to be displayed. The annotation model may indicate the location in a similar manner as the highlighting model and/or the redaction model.

To further elaborate on the picture highlighting, in one example, a user may enter a search query with a search term of "circle." In this example, a highlighted portion of the document may include circles that are shown in pictures of the document. In another example, a user may enter a search term of "nail," and any nails illustrated in pictures of the document would be highlighted. In some embodiments, a search term may apply to both text and pictures; for example, if a user enters the "circle" search term, the word "circle" in the text may be highlighted as well as circles in the pictures.

At block 765, as well as line 7070, in a viewport (e.g., viewport 724) of a graphical user interface of the client computing device 104, a rendering of the document model is displayed (e.g., by the viewer module 7001, such as the viewer module 194 of FIG. 1) including highlighting on the highlighting portion. In some embodiments, this displaying of the highlighting on the highlighting portion of the document model includes determining a visible portion of the viewport and displaying only the highlighted portion of the document models contained in the visible portion of the viewport. For instance, in some embodiments, if only a single paragraph is highlighted, only the highlighted paragraph is displayed.

The text highlighting (performed, e.g., by the highlighting module 7004) may be accomplished by any suitable technique. For instance, the highlighting may be overlaid onto the text. In this regard, in some embodiments, the document processing module 146 creates a layer that includes the highlighting and burns the layer created layer on top of an image of the document. In other embodiments, the highlighting layers are maintained as a separate image file for processing at the client device 104 when the document is displayed thereat. The color of the highlighting may be customizable, and may be set by a user through the client device 104 and/or server 7006.

In some embodiments, metadata of the document may also be displayed at block 765 (e.g., the metadata imposed at block 760). In some implementations, the metadata may include: information associated with how the document model is to be displayed; information indicative of a source of the document model; a coding decision associated with the document model; a score assigned to the document model; a machine learning algorithm; and/or information entered via a client device 104. In some implementations, the secondary interface is configured to display at least a portion of the metadata.

In some embodiments, the highlighted portion is made a redacted portion by simply making the highlighted portion the same color as the text (e.g., black), or by overlaying (with no transparency) a solid color (e.g., black) on top of the text.

Figure 7C:
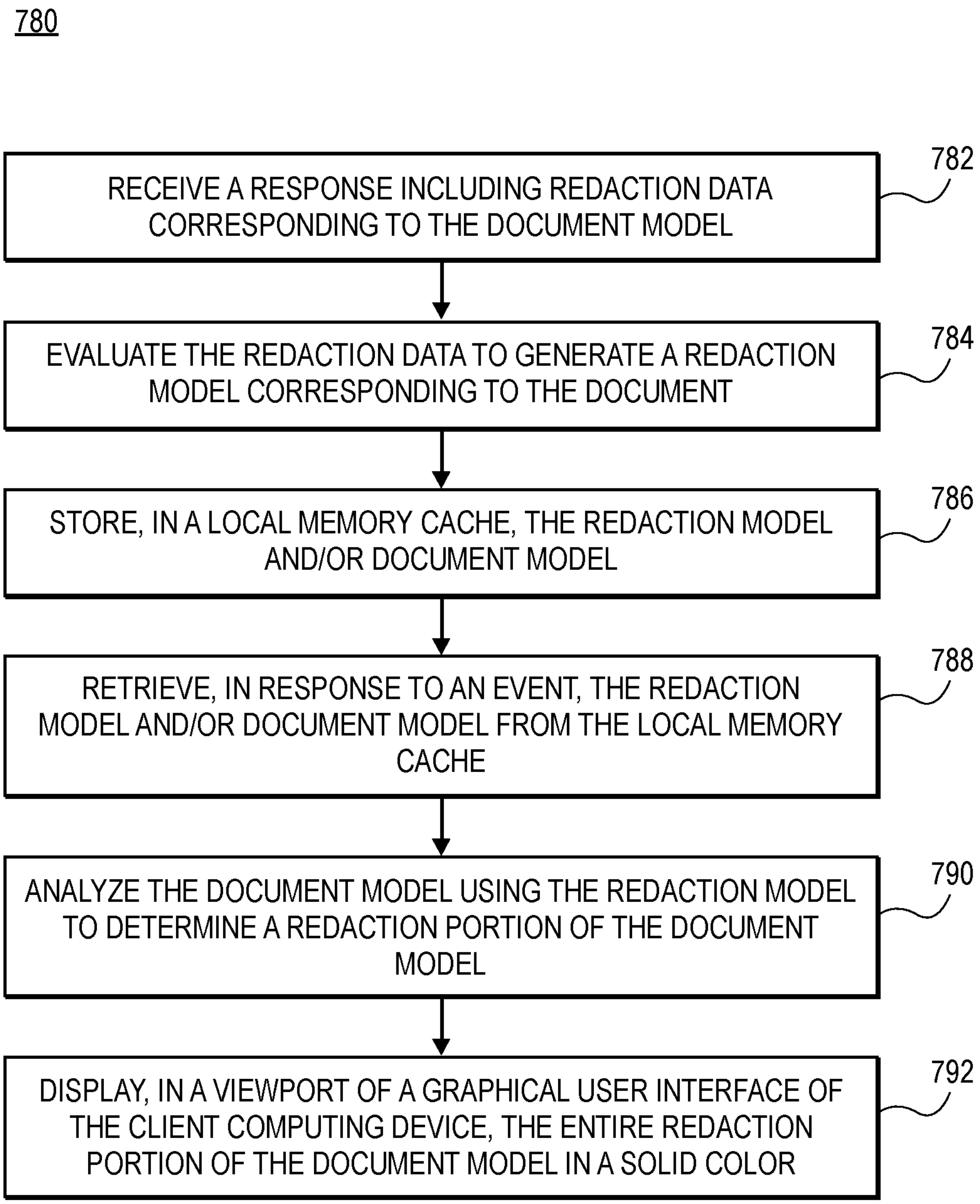
FIG. 7C illustrates an example method of contextual redaction of a document model, according to an embodiment.
Figure 7D:
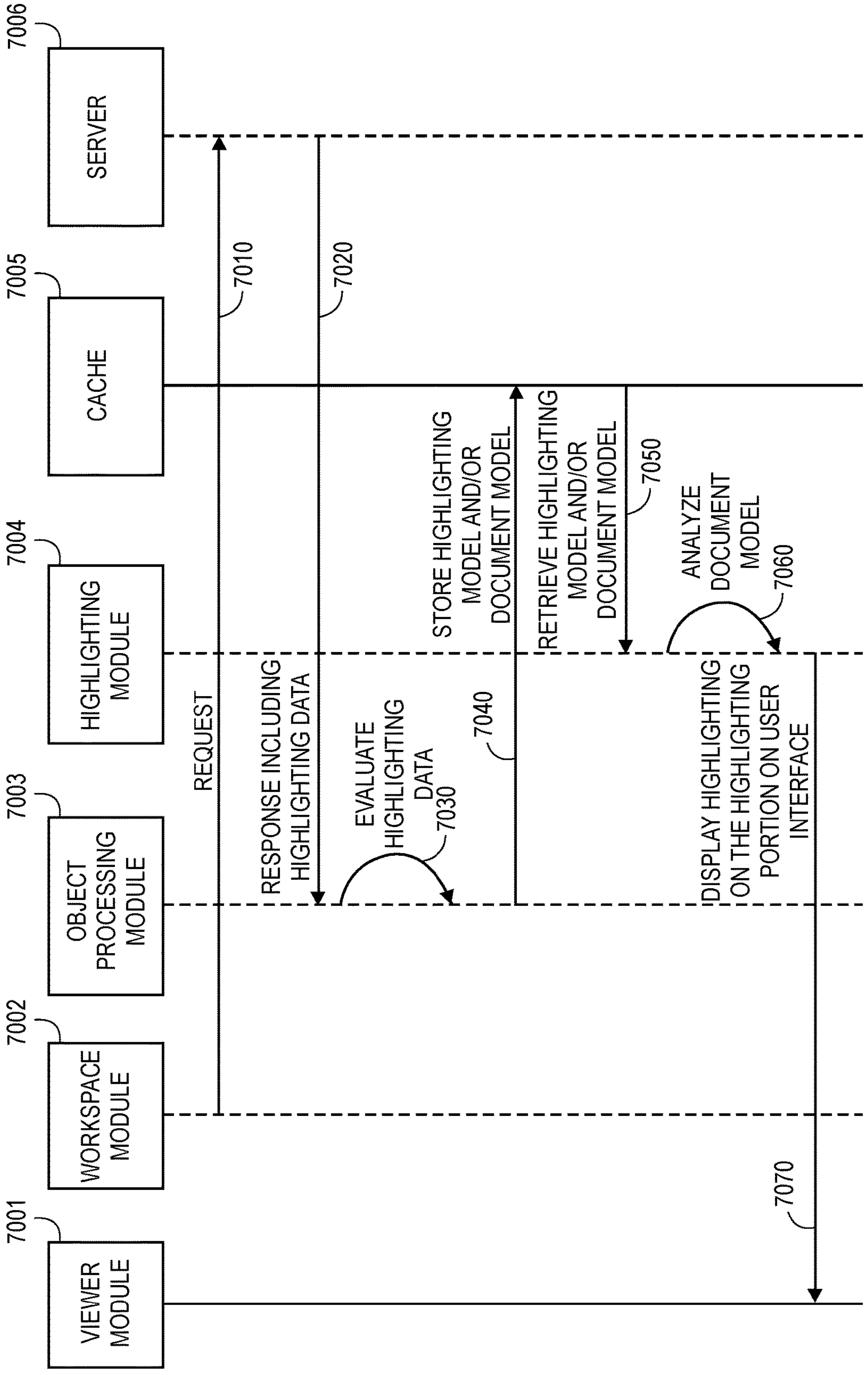
FIG. 7D illustrates an example signal diagram of contextual highlighting of a document, according to an embodiment.
Figure 7E:
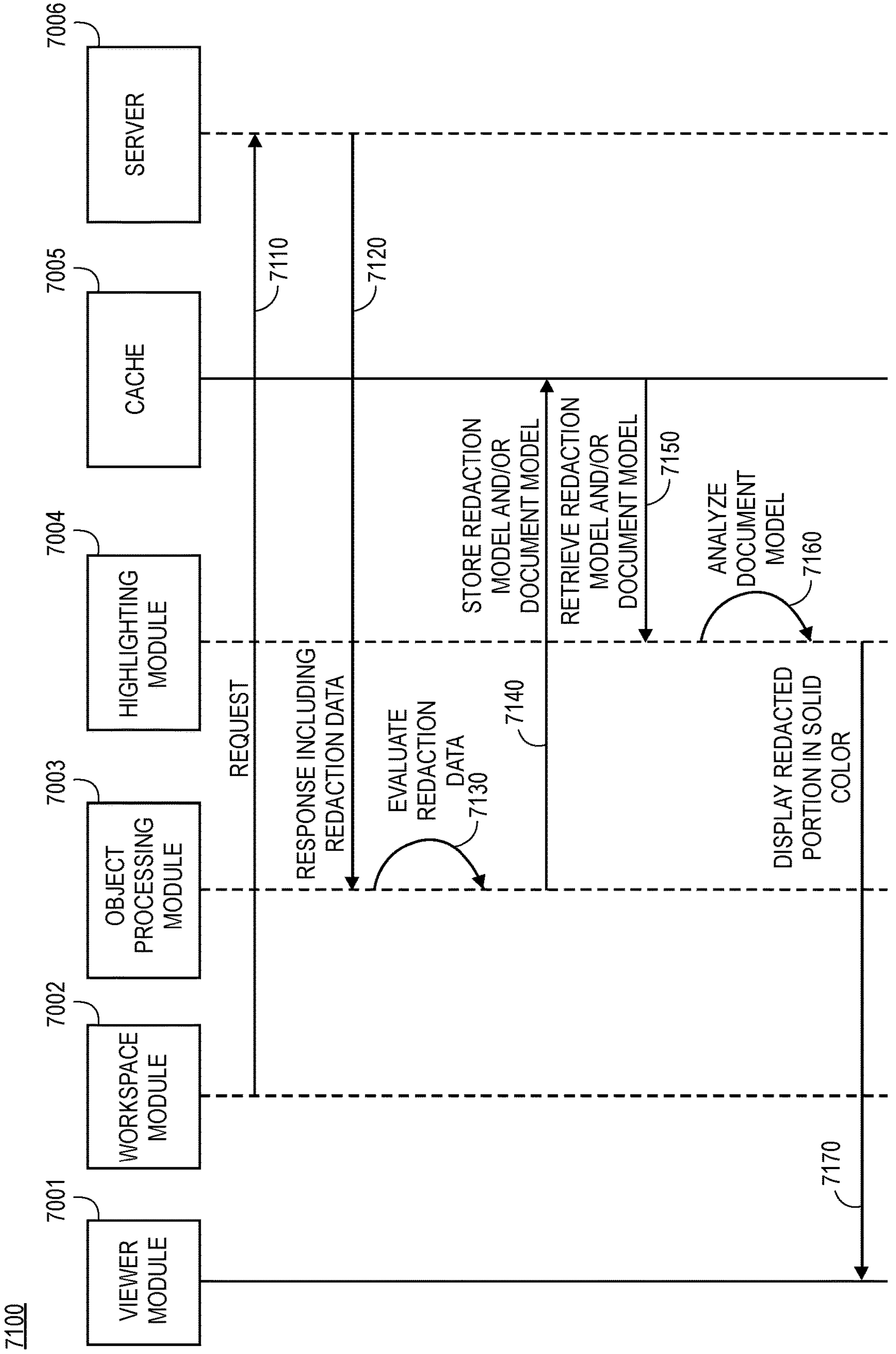
FIG. 7E illustrates an example signal diagram of contextual redaction of a document, according to an embodiment.

FIG. 7C illustrates an example method 780, which relates more specifically to redaction. And, to even further illustrate, FIG. 7E depicts an example signal diagram 7100 for contextual redaction of a document. In some aspects, the example signal diagram 7100 of FIG. 7E corresponds to the example method of FIG. 7C, but the example signal diagram 7100 further illustrates some aspects of interactions between components.

With continuing reference to both FIGS. 7C and 7E, at block 782, as well as line 7120, the client device 104 receives a response from the server 7006. In some embodiments, the server 7006 sends the response responsive to a request from the client device 104. For instance, as illustrated by line 7110 of FIG. 7E, the workspace module 7002 (such as the workspace module 192 of FIG. 1) may send a request to the server 7006.

The response, received by the object processing module 7003, may include redaction data corresponding to the headless object.

At block 784, as well as line 7130, the redaction data is evaluated (e.g., at the highlighting module 7004, which, it should be understood that, in this illustrated example, acts as a redaction module) to generate a redaction model corresponding to the document. For example, the generated redaction model may indicate the specific word(s) to be redacted. For instance, a person's name may be redacted from documents to allow a person to remain anonymous. In another example, words or phrases including trade secret data may be redacted. In yet another example, words or phrases that relate to national security issues may be redacted.

At block 786, as well as line 7140, the redaction model and/or document model is/are stored (e.g., by the object processing module 7003) in a local memory cache 7005.

At block 788, as well as line 7150, in response to an event, the redaction model and/or document model is retrieved (e.g., by the highlighting/redaction module 7004) from the local memory cache 7005. Advantageously, retrieval from the cache 7005 is faster than from, for example, the server 7006. In this regard, the storing/retrieval of the redaction model to/from the cache 7005, as described herein, allows for faster and more efficient document viewing than in previously known systems.

In some embodiments, the event is an event caused by a user of the client computing device 104, for example, the user clicking on a document from the list of the selection table 604. In this regard, the retrieving of the redaction model and/or document model from the local memory cache 7005 may include selecting the redaction model and/or document model based on the event caused by the user. Additionally or alternatively, the event may be a search query event, and the selecting may include selecting the redaction model and/or document model based on one or more criteria included in the search query event. In one example, the search query event comprises the user entering text into input box 608.

At block 790, as well as line 7160, the document model is analyzed using the redaction model to determine a redaction portion of the document model. In some embodiments, the analyzing the document model using the redaction model to determine a redaction portion of the document model includes imposing metadata included in the redaction model onto a subset of the document model for subsequent display thereof. In some implementations, the metadata may include: information associated with how the document model is to be displayed; information indicative of a source of the document model; a coding decision associated with the document model; a score assigned to the document model; a machine learning algorithm; and/or information entered via a client device 104. In some implementations, the secondary interface is configured to display at least a portion of the metadata.

The redaction portion may be any length of text. For example, in some embodiments, the redaction portion is only a word or a few words (e.g., a person's name). In other embodiments, the redaction portion may be any paragraphs containing a word or phrase. In this regard, the amount of text to redact may be set at one or both of the client device 104 and/or the server 7006.

At block 792, as well as line 7170, in a viewport (e.g., viewport 624) of a graphical user interface of the client computing device 104, the entire redaction portion of the document model is displayed in a solid color; and thus, any text in the redaction portion is not able to be read by anyone viewing the graphical user interface.

In some embodiments, the entire example methods 730, 780 may be performed by one or more processors of the client device 104 (e.g., the processor 170). However, any component may perform any block of the example methods; for example, any or all of the blocks of the example methods 730, 780 may be performed by the server 7006 and/or additional client device(s) (not illustrated in FIG. 1).

Furthermore, it should be understood that, although the example of FIG. 7A illustrates an implementation including patent documents, any type of documents may be used.

VIII. Display of Multiple Documents

Figure 8A:
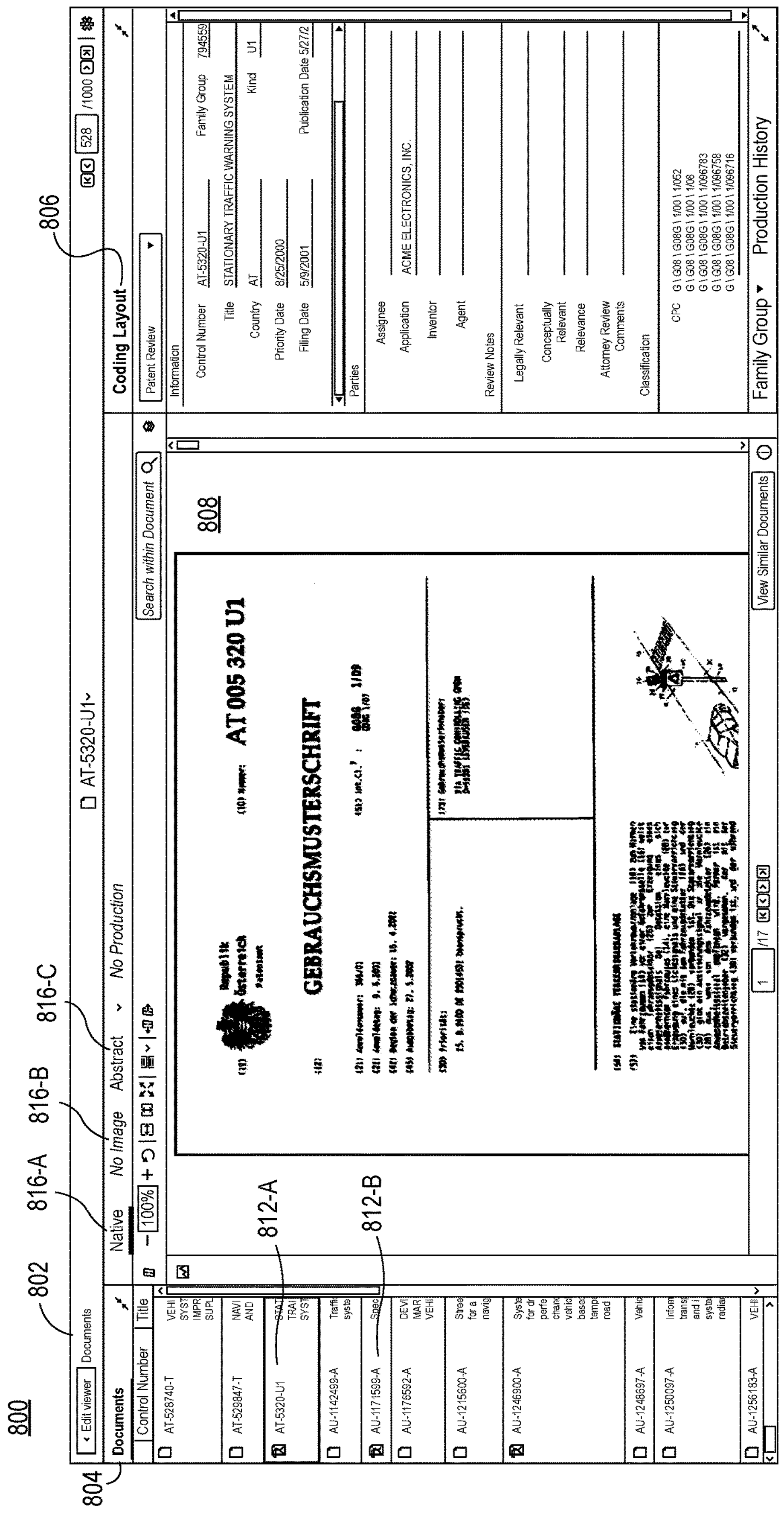
FIG. 8A illustrates an example user interface for displaying multiple documents, according to an embodiment.

FIG. 8A illustrates an example user interface 800 for displaying multiple documents, according to one embodiment and scenario. The multiple documents may correspond to one or more document models represented as one or more nested data structures, as described herein. The user interface 800 may include a document viewer viewport 802, including a document list viewport 804, a document information viewport 806, and a first document viewport 808. The document list viewport 804 may include a plurality of documents 812, including a selected document 812-A and an unselected document 812-B.

The document 812-A may be selected because a user has selected the document 812-A, or in some aspects, for another reason (e.g., due to a user selection in a prior session, due to a default, according to sorting criteria, etc.). The contents of the selected document 812-A are depicted as being displayed in the first document viewport 808. Each of the documents 812 may correspond, respectively, to one or more document models. For example, the document 812-A is depicted as having 17 pages, of which the first page is displayed in the document viewport 808. In some embodiments, each of the 17 pages may correspond to a respective document fragment model. Each of the 17 pages may be rendered separately by the viewport 808. For example, the object processing module 193 of FIG. 1 may process one or more object models into one or more respective document models. Each of the respective document models may include one or more respective document fragment models. The viewport 808 may render the document models and/or document fragment models in the viewport 808, wherein, for example, each document fragment model corresponds to one of the 17 pages. In some aspects, the object processing module 193 may process a single object model into a document model including 17 portions, each corresponding to a respective one of the 17 pages. In some examples, the viewport 808 may render the document 812-A and/or its individual pages in response to the user selecting a graphical user interface element (e.g., the next page button in the user interface 800) or in response to another input event, according to the principles discussed elsewhere herein.

The user interface 800 may include instructions for rendering one or more document models to display documents or document fragments in the viewport 808 in response to one or more events received from the user (e.g., in response to one or more mouse clicks detected by the workspace module 192 of FIG. 1 via the one or more I/O devices 172). Specifically, the user interface 800 may include instructions for processing one or more document models to generate the document 812-A in the document viewport 808 in response to a mouse click, in accordance with the principles discussed elsewhere herein. In some aspects, the user interface 800 may be displayed in a client device (e.g., the client 104). In that case, a module of the memory 180 may include instructions that, when executed, cause the client device 104 to detect (e.g., via the I/O device 172) a user event corresponding to a mouse selection of document 812-A. In response to detecting the user event, the viewer module 194 of FIG. 1 may render a further document model corresponding to the user event. For example, when the user event corresponds to a key down event, the viewer module 194 may cause the document viewport 808 to render a corresponding subsequent document fragment model, such that a different portion of the document 812-A (e.g., a subsequent page) is displayed in the document viewport 808. As discussed elsewhere, document fragment models may correspond to things other than document pages, such as attachments, spreadsheet workbooks, bookmarks, hyperlinks, etc. Each of these may be rendered differently, according to document fragment model-specific instructions. In some aspects, the viewer module 194 may cause one or more document fragment models to be rendered and displayed in the viewport 808, based on the prior rendering and display of prior document fragment models.

In some embodiments, one or more document models corresponding to the unselected document 812-B may be rendered in a second document viewport of a web browser (not depicted). Specifically, the present techniques may include generating the user interface 800 such that the user interface 800 includes a plurality of viewports (e.g., the document list viewport 804, the document information viewport 806, the first document viewport 808, and the second document viewport, and/or more document viewports). Any document model may be rendered into any of these viewports, depending upon individual configuration and embodiment use case. Generating the user interface 800 may include processing a respective set of object models associated with one or more of the documents 812, to generate a plurality of document models associated with each of the set of object models. Each of the plurality of document models may be rendered and displayed in the respective viewport to which they belong. In some cases, the processing of object models to document models may be performed according to a predictive algorithm, as discussed elsewhere herein. The viewport may include instructions for automatically rendering any document models stored in a particular memory location.

In some embodiments, generating the user interface 800 may include processing an object model to generate one or more document models, each corresponding to one or more of the documents 812. When the user selects one of the documents 812, instructions (e.g., computer-executable instructions stored in the object processing module 193) may receive one or more object models corresponding to the selected document. For example, the correspondence may be maintained via a key/value system. The instructions may include processing one or more of the object models to generate one or more corresponding document models. The object models and/or the document models may be stored within the cache 160, in some aspects. A set of separate instructions (e.g., computer-executable instructions stored in the viewer module) may be configured to immediately render any document model generated by the object processing module 193 in the viewport. In some aspects, the retrieval/receipt and processing object models may be optimized via a predictive algorithm.

The document may be rendered in the viewport 806 by the viewer module 194 rendering the one or more generated document models. In this way, the user may experience little to no perceptible delay in navigating from document to document. Empirical performance testing has demonstrated improved performance in this regard. It should be appreciated that the depicted examples are simplified for the sake of explanation. For example, in some embodiments, instead of including the rendering of the unselected object 812-B in a second document viewport of a browser that is displayed when the user makes a selection from the list 804, the document viewer viewport 802 may instead include a side-by-side display, wherein the first document viewport 808 and one or more additional document viewports are displayed in a vertical or horizontal split. Such splits may be configurable by the user, and may include different display modes such as stacking, floating, etc. Further, the user interface 800 may display additional/different information related to the documents 812, such as search results, a thumbnail view, etc. in viewports.

In some embodiments, one or more document models corresponding to one or more of the documents 812 may be rendered in one or more document view viewports 816. Each of the document view viewports 816 may include different aspects corresponding to a selected document 812. For example, the user interface 800 may include a document view viewport 816-A representing a native rendering of the document 812-A, a document view viewport 816-B representing an image rendering of the document 812-A, and a document view viewport 816-C representing extracted text rendering of the document 812-A. In some embodiments, the document view viewport 816-C may include instructions for rendering a two or more of document fragment models corresponding to the document 812-A (e.g., an attachment, a bookmark, a hyperlink, etc.) in, for example, a selectable list form. This list of document fragment models may be rendered in a dropdown menu, for example. When the user selects one of the document fragment models from the list, the user interface 800 may display a viewport including a rendering of the selected document fragment model in place of the first document viewport 808. The user interface 800 may have previously rendered each of the related document fragment models in the selectable list, such that there is no rendering delay.

It should be appreciated that the present techniques improve conventional document review computing systems by enabling user interfaces (e.g., the user interface 800) to include multiple different document models, rendered in multiple viewports that may be displayed in response to user selections (e.g., a user event) with low latency. As noted above, conventional display of documents does not facilitate generation document models from object models with low latency, and display of those document models in a web browser.

Figure 8B:
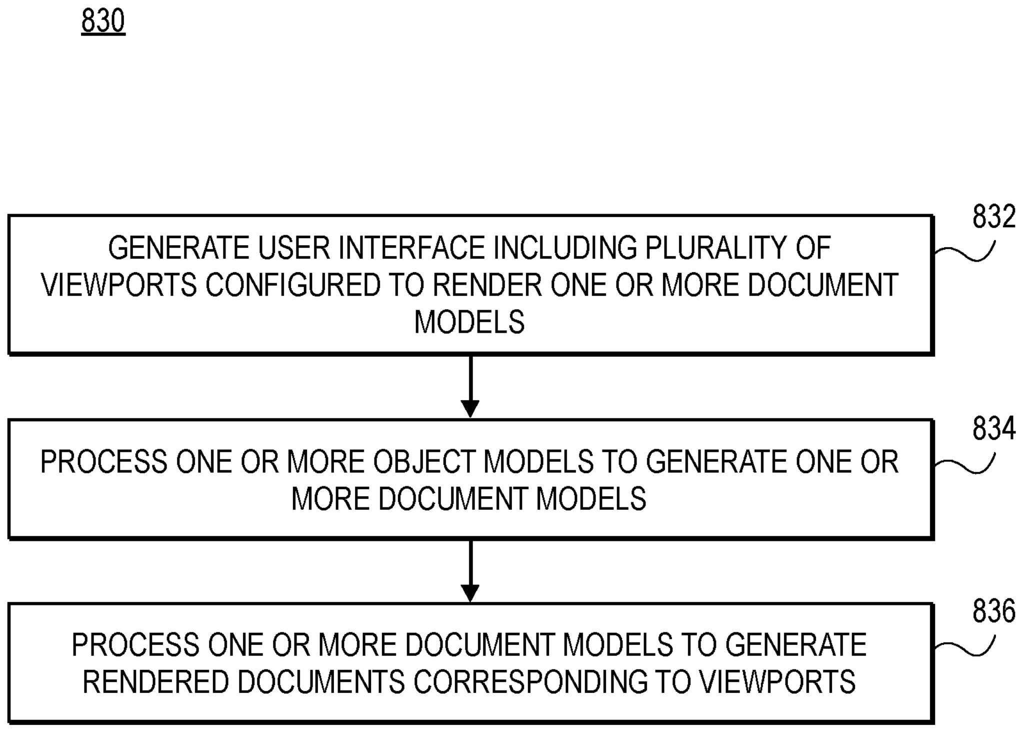
FIG. 8B illustrates an example method of generating user interfaces for displaying multiple documents via one or more document models, according to an embodiment.
Figure 8C:
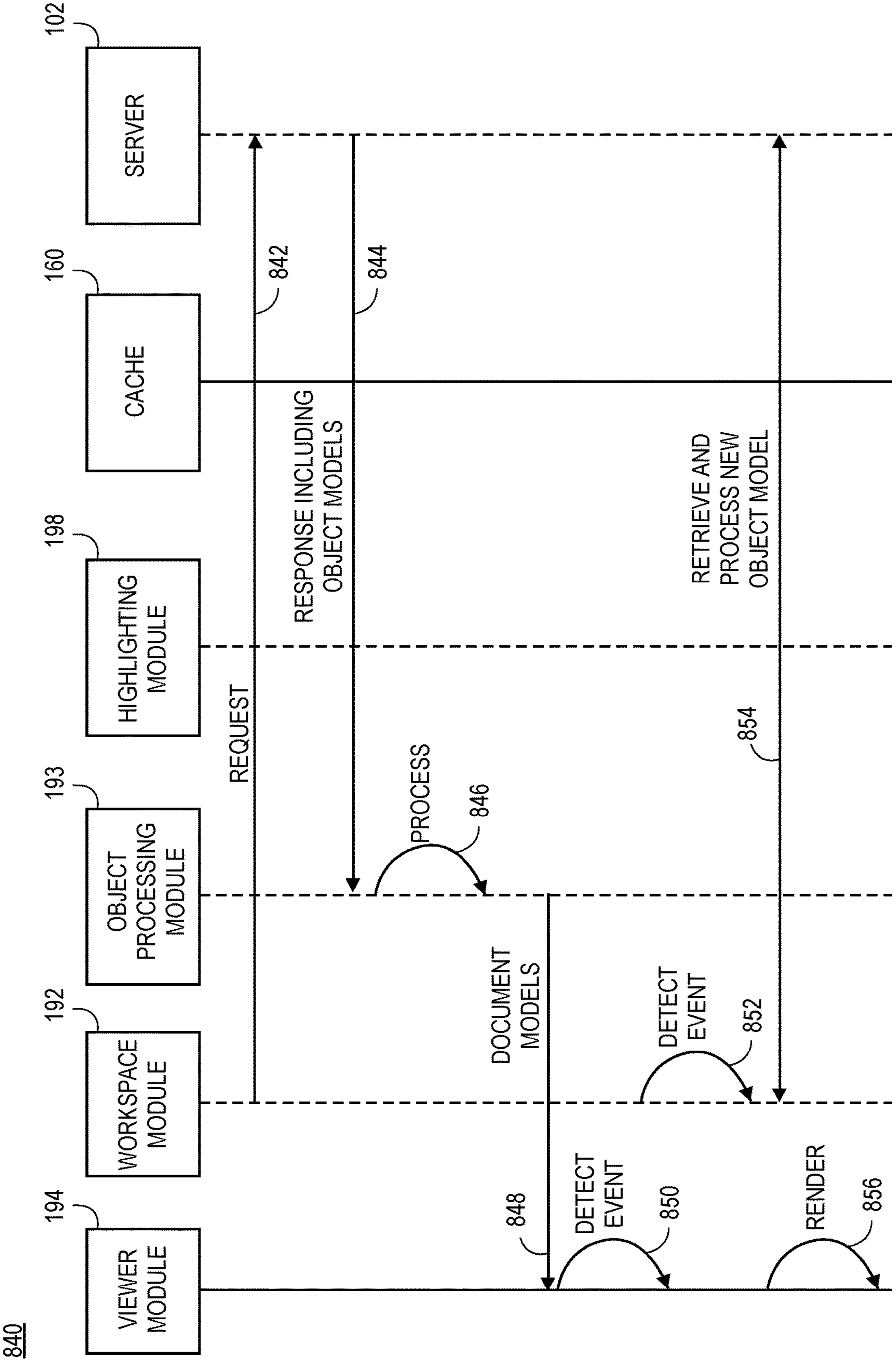
FIG. 8C illustrates an example signal diagram for displaying multiple documents via one or more document models, according to an embodiment.

FIG. 8B illustrates an example method 830, which relates more specifically to the display of user interfaces displaying multiple documents via one or more document models, as depicted in FIG. 8A. FIG. 8C illustrates an example signal diagram 840 for displaying multiple documents via one or more document models.

In some embodiments, the example signal diagram 840 of FIG. 8C corresponds to the example method 830 of FIG. 8B (e.g., the example signal diagram 840 may further illustrate some aspects of interactions between components of the environment 100 of FIG. 1). Further, the example signal diagram 840 and the method 830 may be described in relation to the user interface 800.

With continuing reference to FIG. 8A, FIG. 8B and FIG. 8C, the method 830 may include generating, by one or more processors, a graphical user interface, wherein the user interface includes a plurality of viewports each configured to render a respective one or more documents (block 832). As discussed above, the document models may be generated by processing one or more object models including raw data. For example, as discussed above with respect to FIG. 1, the interface identification module 141 may facilitate the generation and/or population of data within one or more user interfaces. The one or more user interfaces may include one or more viewports. The one or more viewports may be respective portions of the user interface for displaying one or more portions of respective documents. In some aspects, the viewer module 194 of FIG. 8C may include instructions for generating one or more graphical user interface.

Specifically, the workspace module 192 of FIG. 1 may retrieve one or more processed document models created by the viewer module 194 (or another module) from the memory 180 of FIG. 1, and cause the document models to be rendered in the one or more viewports of the user interface 800. Each of the viewports may have a respective object focus, such that the respective object focus is independent of the object focus of other viewports. In some embodiments, one or more of the modules 190 of the client 104 may include instructions for generating the user interface at block 832, and for performing other operations. In some embodiments, the user interface may correspond to the user interface 800 of FIG. 8A.

In some aspects, the method 830 may include processing one or more object models to generate one or more document models, each corresponding to a respective one of the one or more documents (block 834). For example, for each of the plurality of viewports, a plurality of respective object models may be received and processed to generate a plurality of document models. In some embodiments, the user interface 800 may be generated by the workspace module 148, including operations for performing the document model rendering/display operations discussed above. The user interface 800 may be generated by the viewer module 194, in some embodiments. In this case, the user interface 800 may include instructions for downloading a list of object models from the object generation module 144 via the network 105, for example. The list of object models may be associated with the selected document, for example. For example, the object processing module 193 may include instructions for populating respective sets of object models corresponding to documents, and processing the object models.

In some aspects, the method 830 may include processing, for each of the plurality of viewports, the one or more corresponding document models to generate a plurality of rendered documents, each corresponding to a respective one of the plurality of viewports (block 836). For example, another module (e.g., the viewer module 194) may include instructions for rendering the plurality of documents 812 in the document list viewport 804, and for rendering other document views/document fragment models (e.g., the rendering shown in the first document viewport 808). The viewer module 194 may render a number of additional document models in one or more additional viewports. The additional rendering may be based on a pagination value (e.g., a number representing the number of documents in the document list viewport 804 (e.g., 20 documents)), or on another value (e.g., an amount of available memory in the memory 180 of the client device 104, an amount of estimated memory used to display the respective sets of document models, properties included in the raw data of the object models, etc.).

In some embodiments, the viewer module 194 may render the document models according to metadata within the document model, and/or based on a layout of the graphical user interface (e.g., in response to a user selection modifying the layout of the document viewer viewport 802). For example, the user may select a layout toggle that modifies the document information viewport 806 from a horizontal split displaying two viewports, to a vertical split displaying the two viewports side-by-side. In still further embodiments, a viewport may display a rendering of other information, such as a Relativity short message format (RSMF) file, a document timeline view representing changes to the file over time, etc.

In still further embodiments, a difference, or delta, document model, representing changes from one file to another may be rendered in a side-by-side view enabling a user to view the changes (e.g., a forwarded email wherein only one character was changed by the sender). In such embodiments, a diff module (not depicted) may perform additional processing steps, including analyzing an association between two or more related documents models in the plurality of document models. The viewer module 194 may then render, based on the association (e.g., a difference of one or more bytes), each of the related document models in a respective one of the plurality of viewports. The viewer module 194 may further cause an indication of the association between the two or more related document models in the plurality of document models to be presented in the user interface 800. The indication may indicate a document difference (e.g., as a Boolean value, a count of characters/bytes, a percentage, etc.). In still further embodiments, the diff module generates multiple document diffs. For example, the diff module may generate a first diff related to portions of the document 812 displayed in the document view viewport 816-C, as represented by multiple document models.

Turning to FIG. 8C, in some aspects, the server 102 receives a request from the workspace module 192 to receive one or more object models, as represented by line 842 of FIG. 8C. The request may include, for example, one or more parameters indicating object models corresponding to one or more documents in the document list viewport 804. The server 102 selects one or more object models based on the one or more parameters, and sends a response to the client device 104 (e.g., the object processing module 193) that includes the one or more object models. For example, the request may be an initial document viewer request. The server 102 may select a first object model that corresponds to the document 812-A, and which includes a document information object model for processing and display in the document information viewport 806, an image object model for processing and display in the document viewport 816-B, a further nested set of object models for processing and display in the document view viewport 816-C, etc. The specific layout of the document viewer viewport may be modified, based on the needs of individual implementations.

At block 193, as shown by line 846, the object processing module 193 may process one or more of the object models to generate the one or more document models. The document models may be received by the viewer module 194, as shown by line 848. In some aspects, the document models may be received at another memory location (e.g., the cache 160). The viewer module 194 may render the one or more document models, in accordance with the principles discussed elsewhere herein (line 850). For example, the viewer module 194 may include instructions for automatically rendering any document models received from the object processing module 193, and/or according to other criteria, as discussed herein.

The workspace module 192 may detect one or more event of the user and/or in an initial rendering as described above. In some embodiments, the detected event at line 852 is an event caused by a user of the client computing device 102, for example, the user clicking on a document from the document list 804 of FIG. 8A. In this regard, the workspace module may cause the viewer module 194 to perform an "on demand" rendering of a different document model by receiving an the object model corresponding to the detected event, processing the object model to generate a new document model and/or document fragment model, and providing the new generated document model and/or document fragment model to the viewer module 194. Additionally or alternatively, the event may be a search query event or initial request with parameters, and the receiving may include receiving the object model, and subsequently processing it, based on one or more criteria included in the one or more parameters. In one example, a query event includes the user entering text into an input box.

Once the workspace module 192 retrieves and processes one or more object models at line 854, the viewer module 194 may render the new document model(s) and/or document fragment model(s) in one or more of the viewports, as shown at line 856. For example, the scroll wheel of the document list viewport 804 may be advanced to a particular position, based on the identity of a selected document from the plurality of documents 812. In some embodiments, the scroll event may be detected by the workspace module 192, which advances the rendered document to a particular page number by retrieving and processing additional document fragment models corresponding to the document rendered in the first document viewport 808. When the user has selected the document view viewport 816-B representing an image view of the document 812-A, selecting a new document from the documents list viewport 804 may cause the new document to be displayed in a viewport, such that the document view viewport 816-B is visible to the user. It should be appreciated that each viewport may include different respective functions for setting one or more aspects of document renderings, and that one or more of these aspects may be performed with respect to each respective viewport at line 854.

IX. Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for practicing the techniques disclosed herein through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s).

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed is:

1. A computer-implemented method, comprising:

generating, by one or more processors, a user interface including (i) a selection interface, and (ii) a viewport, wherein the selection interface presents a list of documents;

receiving a set of object models associated with one or more documents, the object models including respective metadata indicating how to render the object models;

predictively processing one or more of the received object models to generate one or more corresponding cached document models;

rendering the one or more cached document models via the viewport in accordance with the respective metadata of the corresponding object models;

determining, by the one or more processors, that a current document is a threshold number of documents from a position of the list of documents; and responsive to the determination, performing an action based on the one or more object models associated with the list of documents.

2. The computer-implemented method of claim 1, further comprising:

storing one or both of (i) the one or more object models, and (ii) the cached document models in a memory.

3. The computer-implemented method of claim 1, further comprising:

detecting, via the user interface, an indication to view a next document in the list of documents; and responsive to detecting the indication, rendering one or more of the received cached document models via the viewport.

4. The computer-implemented method of claim 3, further comprising:

responsive to detecting the indication, processing a further one or more of the received object models to generate one or more additional cached document models, the further one or more of the received object models associated with an additional document appearing after a current document in the list of documents.

5. The computer-implemented method of claim 3, further comprising:

responsive to detecting the indication, processing a further one or more of the received object models to generate one or more additional cached document models, the further one or more of the received object models associated with an additional document appearing before a current document in the list of documents.

6. The computer-implemented method of claim 1, wherein the position of the list of documents is an end of the list of documents; and wherein the action includes transmitting, to a server, a request to retrieve a subsequent set of object models.

7. The computer-implemented method of claim 1, wherein the position of the list of documents is a beginning of the list of documents; and wherein the action includes deleting, by the one or more processors, one or more object models.

8. The computer-implemented method of claim 1, wherein rendering the one or more cached document models comprises:

generating, by the one or more processors, a rendering for a portion of a current document model.

9. The computer-implemented method of claim 1, wherein predictively processing the one or more of the received object models to generate the one or more cached document models includes generating, by the one or more processors, the one or more cached document models based upon at least one filter criterion.

10. The computer-implemented method of claim 9, wherein the at least one filter criterion includes at least one of a reviewer assignment, a relevancy ranking, an object type, an object tag, an object relation, a keyword or a regular expression.

11. The computer-implemented method of claim 1, wherein rendering the received one or more cached document models via the viewport in accordance with the respective metadata of the corresponding object models includes rendering a first document model within 5msec of detecting an event.

12. The computer-implemented method of claim 1, wherein the viewport is included in an object preview interface of the user interface.

13. The computer-implemented method of claim 1, wherein the viewport is included in an object viewer interface of the user interface.

14. A non-transitory computer readable medium, comprising program instructions that when executed, cause a computer to:

generate, by one or more processors, a user interface including (i) a selection interface, and (ii) a viewport, wherein the selection interface presents a list of documents;

receive a set of object models associated with one or more documents, the object models including respective metadata indicating how to render the object models;

predictively process one or more of the received object models to generate one or more corresponding cached document models;

render the one or more cached document models via the viewport in accordance with the respective metadata of the corresponding object models;

determine, by the one or more processors, that a current document is a threshold number of documents from a position of the list of documents; and responsive to the determination, perform an action based on the one or more object models associated with the list of documents.

15. The non-transitory computer readable medium of claim 14, comprising further program instructions that when executed, cause a computer to:

store one or both of (i) the one or more object models, and (ii) the cached document models in a memory.

16. The non-transitory computer readable medium of claim 14, comprising further program instructions that when executed, cause a computer to:

process, by one or more processors, a further one or more of the received object models in accordance with respective metadata to generate one or more additional cached document models.

17. The non-transitory computer readable medium of claim 14, wherein:

the position of the list of documents is an end of the list of documents; and wherein the action includes transmitting, to a server, a request to retrieve a subsequent set of object models.

18. The non-transitory computer readable medium of claim 14, comprising further program instructions that when executed, cause a computer to:

generate, by the one or more processors, a rendering for a portion of a current document model.

19. A computing system comprising:

one or more processors; and one or more memories having stored thereon instructions that when executed by the one or more processors, cause the computing system to:

generate, by one or more processors, a user interface including (i) a selection interface, and (ii) a viewport, wherein the selection interface presents a list of documents;

receive a set of object models associated with one or more documents, the object models including respective metadata indicating how to render the object models;

predictively process one or more of the received object models to generate one or more corresponding cached document models;

render the one or more cached document models via the viewport in accordance with the respective metadata of the corresponding object models;

determine, by the one or more processors, that a current document is a threshold number of documents from a position of the list of document; and responsive to the determination, perform an action based on the one or more object models associated with the list of documents.

* * * * *